June 20, 1961 H. C. HANSEN 2,989,313

AUTOMATIC PHONOGRAPHS

Filed April 27, 1954 23 Sheets-Sheet 1

INVENTOR:

Hans Christian Hansen,

BY

[signature], His Agent.

June 20, 1961 H. C. HANSEN 2,989,313

AUTOMATIC PHONOGRAPHS

Filed April 27, 1954

23 Sheets-Sheet 2

INVENTOR:

Hans Christian Hansen,

BY

His Agent.

INVENTOR:
Hans Christian Hansen,
BY
[signature], His Agent.

June 20, 1961 H. C. HANSEN 2,989,313

AUTOMATIC PHONOGRAPHS

Filed April 27, 1954 23 Sheets-Sheet 4

INVENTOR:
Hans Christian Hansen,

BY

His Agent.

June 20, 1961 H. C. HANSEN 2,989,313

AUTOMATIC PHONOGRAPHS

Filed April 27, 1954 23 Sheets-Sheet 6

INVENTOR:

Hans Christian Hansen,

BY

Ernest D. Marmorek, His Agent.

June 20, 1961 H. C. HANSEN 2,989,313

AUTOMATIC PHONOGRAPHS

Filed April 27, 1954 23 Sheets-Sheet 5

INVENTOR:

Hans Christian Hansen,

BY

Edward D. Marmorek,
His Agent.

INVENTOR:
Hans Christian Hnasen,
BY
[signature]
His Agent.

June 20, 1961 H. C. HANSEN 2,989,313

AUTOMATIC PHONOGRAPHS

Filed April 27, 1954 23 Sheets-Sheet 8

INVENTOR:

Hans Christian Hansen,

BY

Ernest D. Marmorek,
His Agent.

INVENTOR:
Hans Christian Hansen,
BY
Ewen D. Marwick,
His Agent.

June 20, 1961 H. C. HANSEN 2,989,313

AUTOMATIC PHONOGRAPHS

Filed April 27, 1954 23 Sheets-Sheet 10

INVENTOR:

Hans Christian Hansen,

BY

[signature]

His Agent.

June 20, 1961 H. C. HANSEN 2,989,313

AUTOMATIC PHONOGRAPHS

Filed April 27, 1954 23 Sheets-Sheet 11

INVENTOR:

Hans Christian Hansen,

BY

Ernest D. Marmorek,
His Agent.

June 20, 1961

H. C. HANSEN 2,989,313

AUTOMATIC PHONOGRAPHS

Filed April 27, 1954

23 Sheets-Sheet 12

INVENTOR:

Hans Christian Hansen,

BY

[signature]

His Agent.

June 20, 1961

H. C. HANSEN 2,989,313

AUTOMATIC PHONOGRAPHS

Filed April 27, 1954

23 Sheets-Sheet 13

INVENTOR:

Hans Christian Hansen,

BY

His Agent.

INVENTOR:
Hans Christian Hansen,
BY
Edward D. Marmorek,
His Agent.

June 20, 1961 | H. C. HANSEN | 2,989,313

AUTOMATIC PHONOGRAPHS

Filed April 27, 1954 | 23 Sheets-Sheet 15

INVENTOR:

Hans Christian Hansen,

BY

Ernest D. Marwick, His Agent.

June 20, 1961 H. C. HANSEN 2,989,313

AUTOMATIC PHONOGRAPHS

Filed April 27, 1954 23 Sheets-Sheet 16

INVENTOR:

Hans Christian Hansen,

BY

His Agent.

INVENTOR:
Hans Christian Hansen,
BY
[signature]
His Agent.

June 20, 1961

H. C. HANSEN 2,989,313

AUTOMATIC PHONOGRAPHS

Filed April 27, 1954

23 Sheets-Sheet 18

INVENTOR:

Hans Christian Hansen,

BY

[signature], His Agent.

INVENTOR:
Hans Christian Hansen,
BY
[signature], His Agent.

June 20, 1961 H. C. HANSEN 2,989,313

AUTOMATIC PHONOGRAPHS

Filed April 27, 1954 23 Sheets-Sheet 20

INVENTOR:

Hans Christian Hansen,

BY [signature], His Agent.

INVENTOR:
Hans Christian Hansen,

BY [signature]
His Agent.

June 20, 1961 H. C. HANSEN 2,989,313
AUTOMATIC PHONOGRAPHS
Filed April 27, 1954 23 Sheets-Sheet 22

INVENTOR:
Hans Christian Hansen,
BY
Ernest D. Marusuck,
His Agent.

INVENTOR:
Hans Christian Hansen,
BY
[signature]
His Agent.

2,989,313
AUTOMATIC PHONOGRAPHS
Hans Christian Hansen, 14 Gothersgade, Copenhagen, Denmark
Filed Apr. 27, 1954, Ser. No. 425,949
Claims priority, application Great Britain Apr. 27, 1953
31 Claims. (Cl. 274—15)

Figure 1:
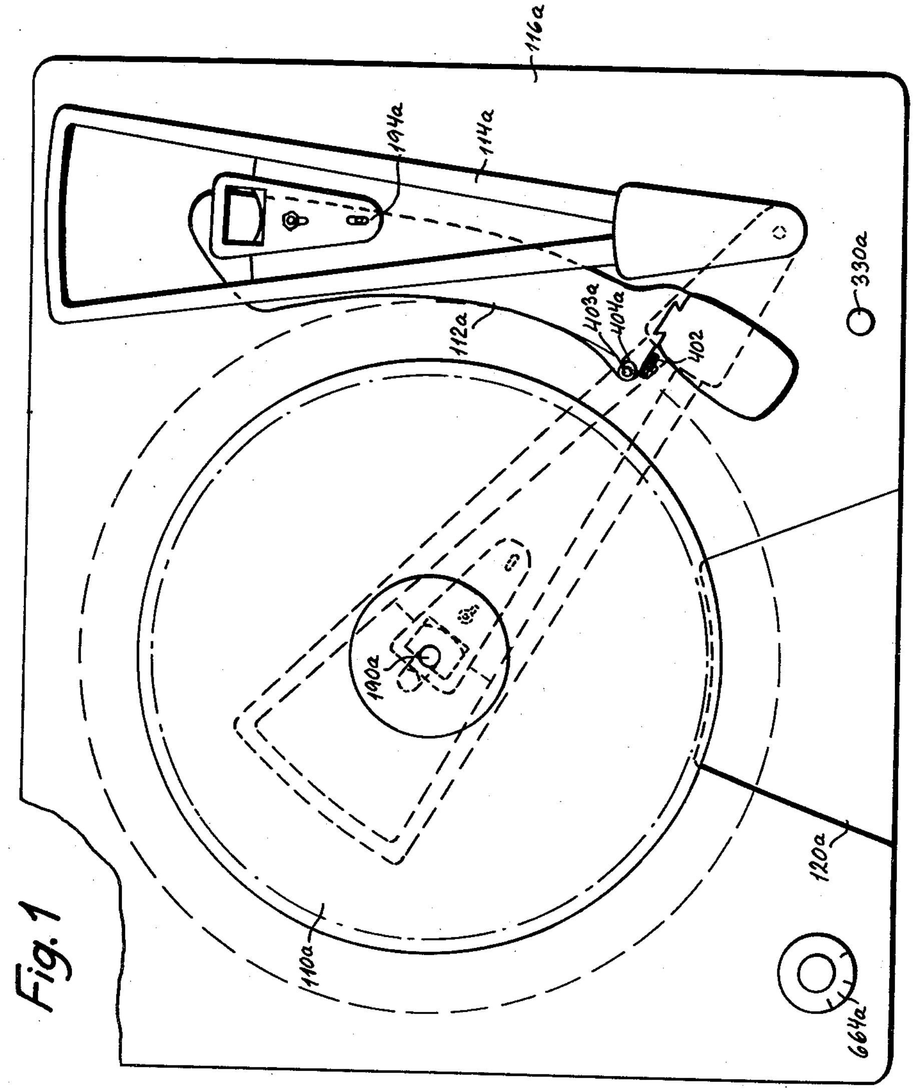

This is a continuation-in-part application of my appliction Ser. No. 225,946, filed May 12, 1951, and relates more specifically to a further development of the species shown in said application in FIGS. 24 through 35.

This invention relates to indexing apparatus for phonograph records.

More particularly the invention relates to indexing or track finder means for use in a phonograph having a tone arm and a stylus member, the tip of which is adapted to be placed into engagement with the initial sound groove of the record.

It is the primary object of the present invention to provide an auxiliary aid in form of an indexing or track finder means for moving the tone arm in a path so as to ensure that the stylus of the tone arm will be deposited in proper position on the surface of the phonograph record near the edge thereof so as to enable the stylus tip to enter into the initial sound groove of the phonograph record.

It is a further object of the invention to provide such aid means which are simple in construction and designed for mass production.

Still another object of the invention resides in providing indexing or track finder means of a light weight structure so as to allow the device to be applied to any existing phonograph without causing any inconvenient increase of the weight of the tone arm and the needle pressure caused by the weight thereof.

It is still another object of the invention to provide a pick-up structure comprising an indexing or track finder arrangement.

Still another object of the invention resides in providing indexing or track finder means which will be reliable in operation and ensure correct depositing of the stylus tip into engagement with the initial sound groove of a record irrespective of the number of revolutions per minute at which the record is rotated within the limits normally used.

Still another object of the invention resides in providing indexing or track finder means capable of supporting the tone arm on the surface of a rotating record with the stylus tip in spaced relationship and carrying the tone arm across the surface of the record to a position with the stylus tip substantially above the initial groove of the record, whereafter the device is capable of releasing the mechanism to deposit the stylus tip into engagement with the sound groove of the record without the risk that the stylus tip will jump over the edge of the record.

Still a further purpose of the invention resides in providing a device which will be capable of performing the function stated in the foregoing paragraph hereof with a reasonable high speed by the travel of the tone arm across the surface of a record rotating slowly and which will also operate safely without the danger that the stylus tip will jump over the edge of a record when travelling across the surface of a record rotating at higher speed.

Still another purpose of the invention resides in providing an indexing device or track finder means capable of moving the tone arm in a position supported with the stylus tip above the surface of the record in one direction to initiate the depositing of the stylus tip on the record surface and thereafter in another direction so that the tone arm assumes a predetermined angular position relatively to the edge of a record when the stylus tip is deposited.

Still another object resides in providing an indexing device or track finder means releasable between a projecting, operative position and a retracted inoperative position in combination with a convenient manipulating arrangement for effectuating the release of the device from the retracted position as a natural function of manual handling of the tone arm of the phonograph.

My invention further comprises a phonograph having an indexing device or track finder means built into a cabinet or suitable article of furniture in which a phonograph is movable between an exterior record loading position and an interior playing position and has as an object to prevent the tone arm or stylus from jumping on the surface of the record.

My invention further provides for a phonograph having a tone arm indexing device or track finder means capable of releasing said track finder means from a retracted inoperative position to a projecting operative position automatically in response to an automatic movement of the tone arm in a path between either playing of a record.

A further object of my invention resides in providing a convenient and simplified record changing device utilizing an indexing arrangement or track finder means.

Figure 2:
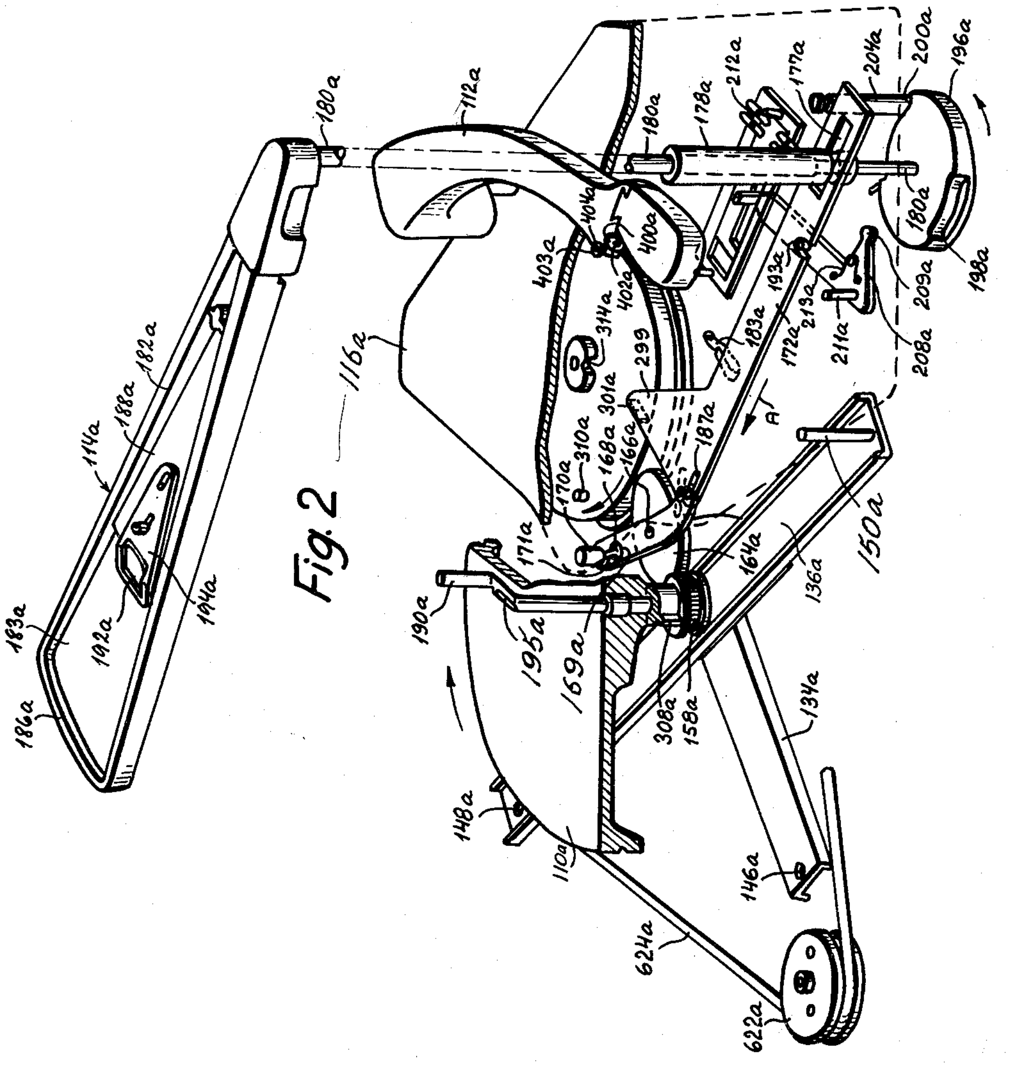
Figures 3, 4, 5:
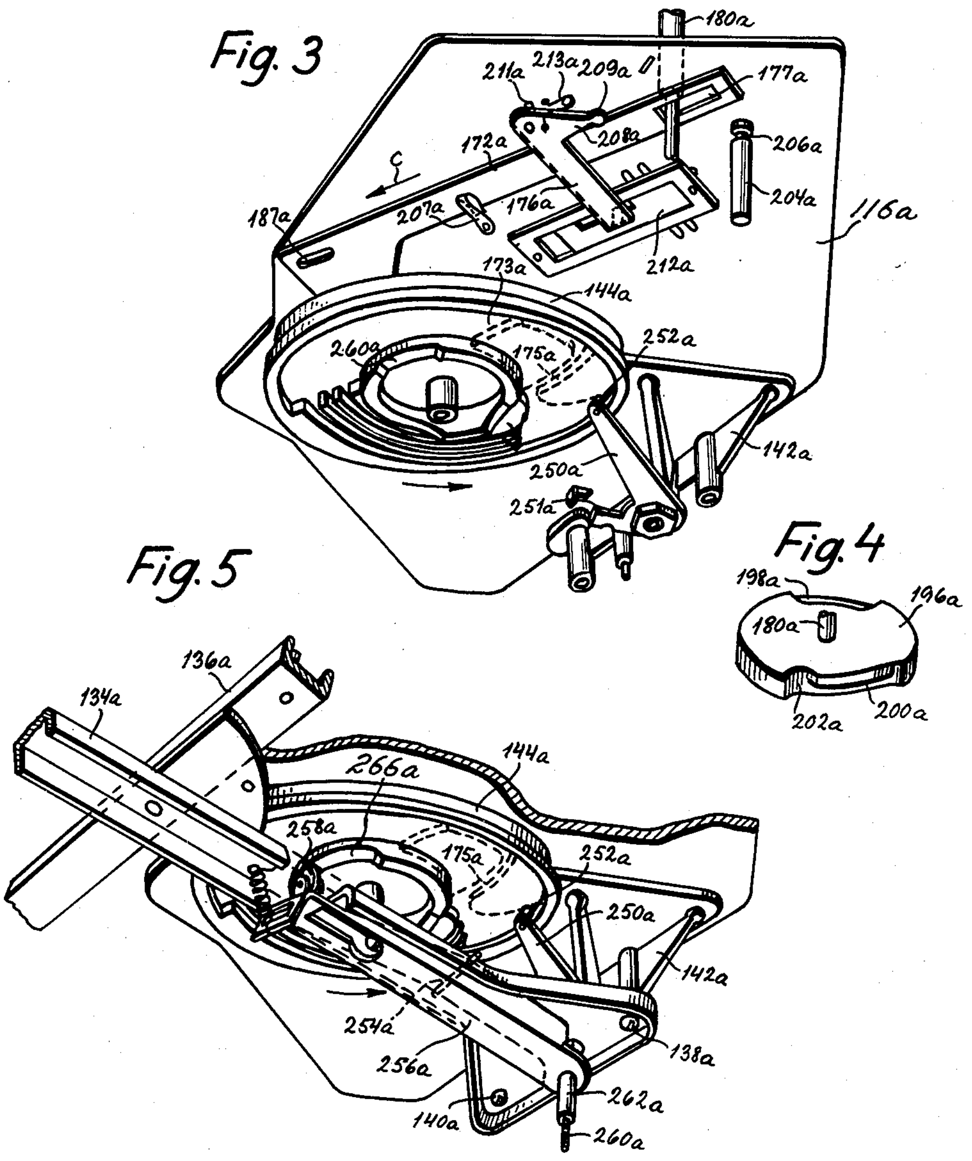

Further objects and features of my invention will appear from the following specification, in which the invention will be described with reference to the drawing in which, FIG. 1 is a plan view of an embodiment of an automatic phonograph according to the invention, FIG. 2 is a perspective top view of the operating parts of the phonograph shown in FIG. 1, FIG. 3 is a perspective view of the cam mechanism and its surrounding parts of the embodiment of FIG. 1 and FIG. 2, FIG. 4 is a detail of the stop and start mechanism shown in FIG. 3, FIG. 5 is a perspective view of the cam mechanism and its surrounding parts in the embodiment shown in FIGURES 1–4, as viewed from the bottom.

Figure 6:
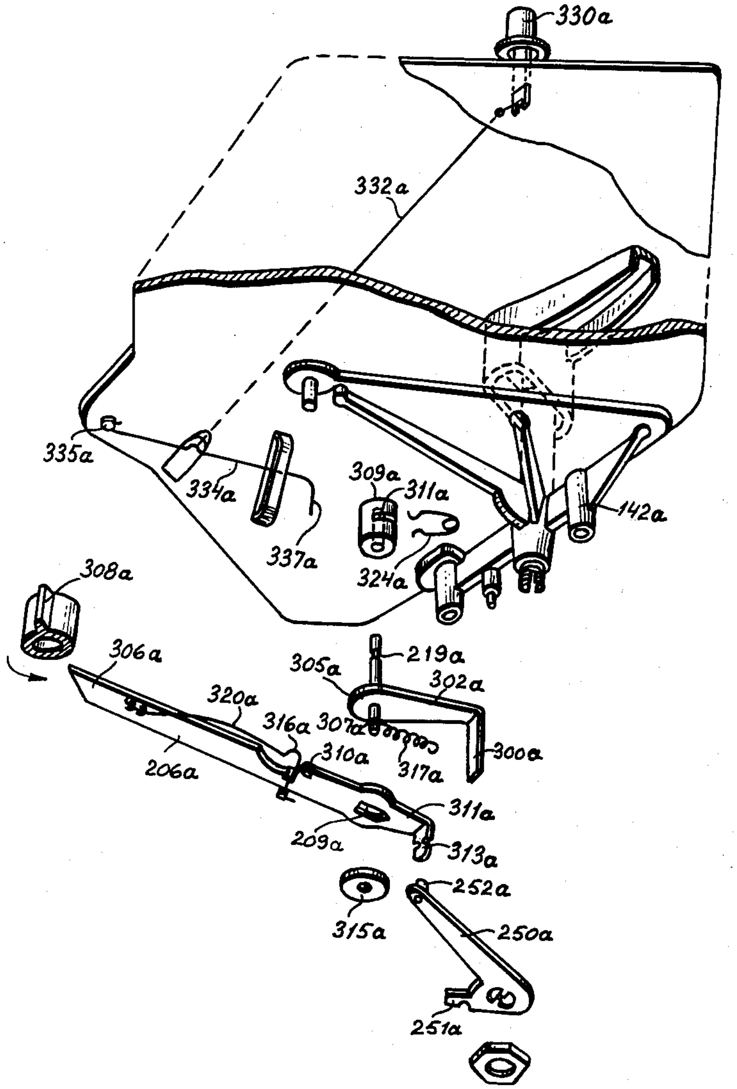

FIG. 6 is a perspective view of the trip starting mechanism of the embodiment shown in FIGS. 1–5.

Figures 9, 10:
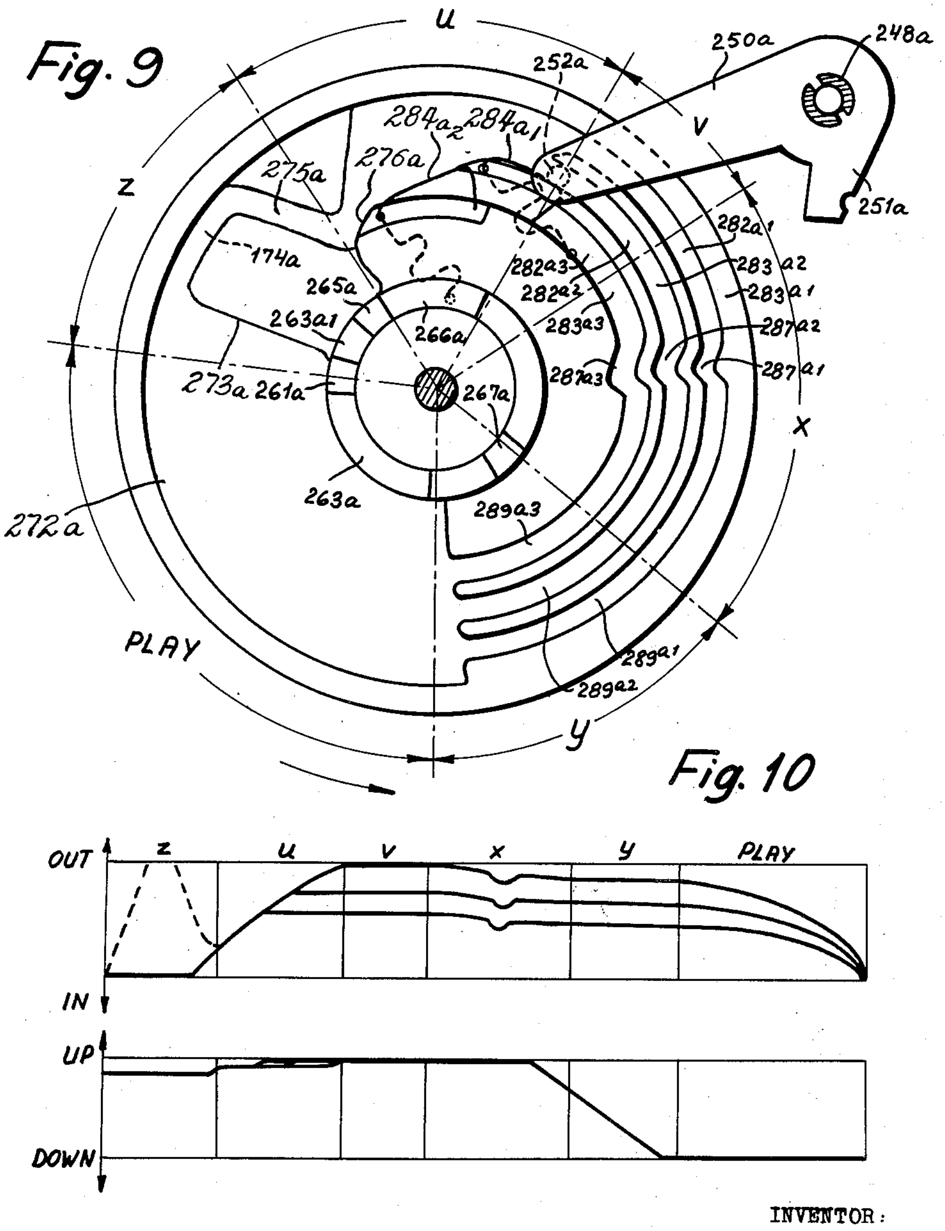
Figure 7:
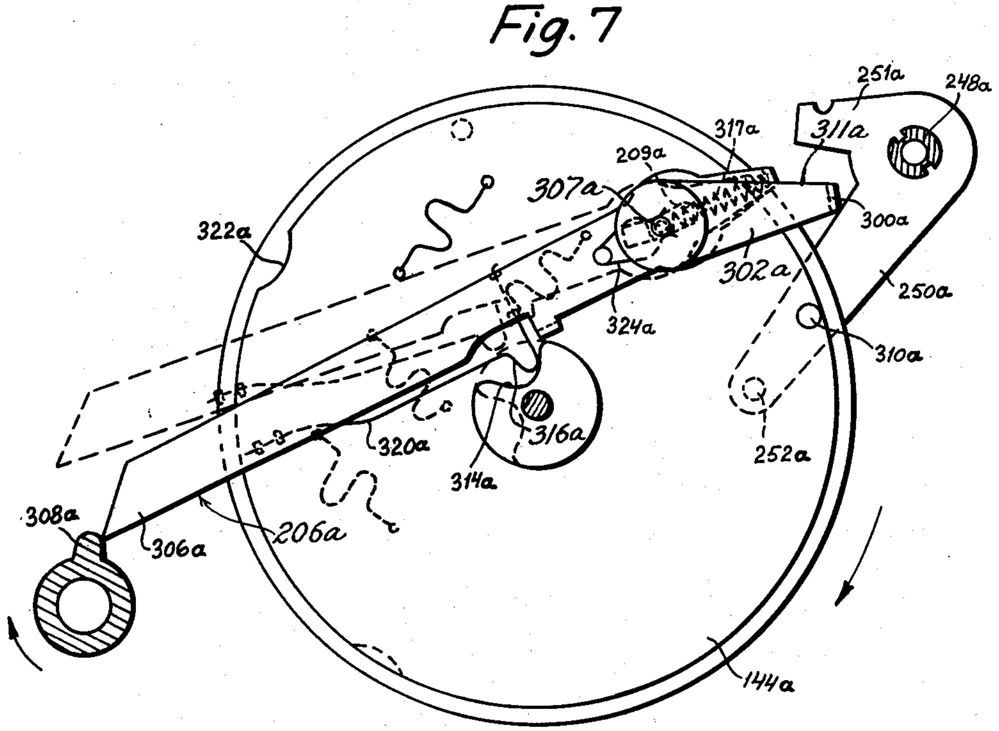
Figure 8:
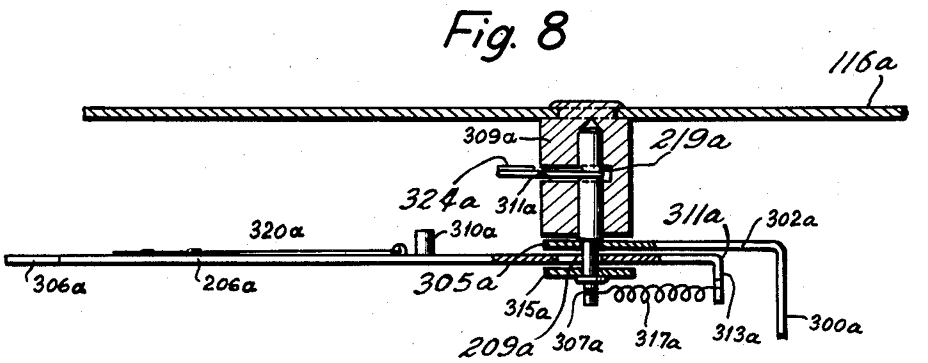
Figures 11, 12:
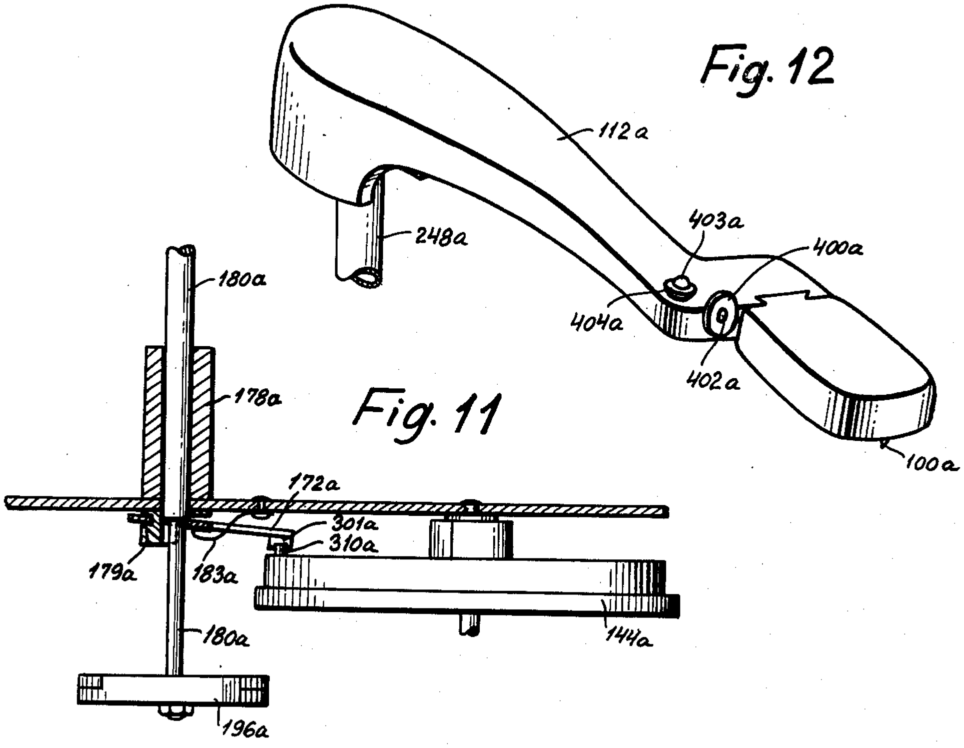
Figure 13:
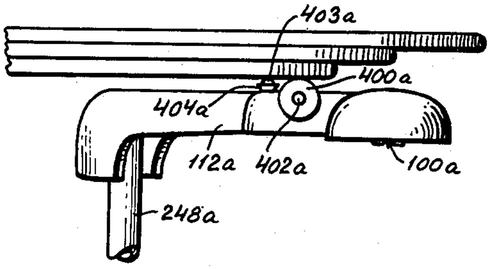
Figure 14:
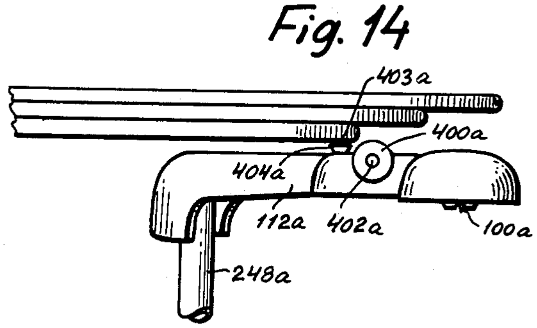
Figure 15:
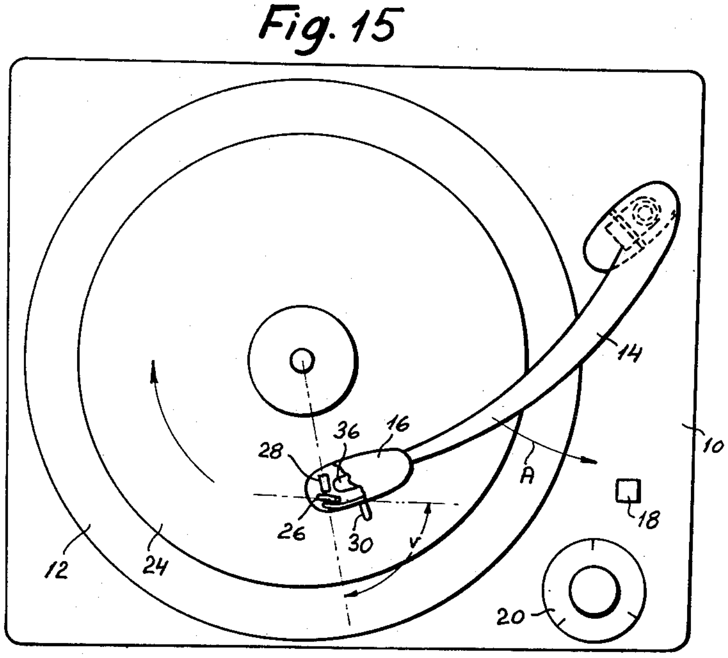
Figure 16:
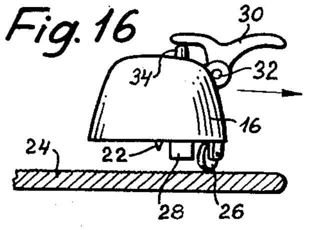
Figure 17:
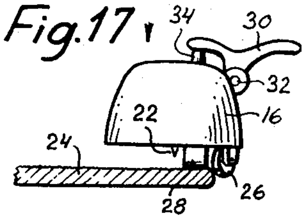
Figure 18:
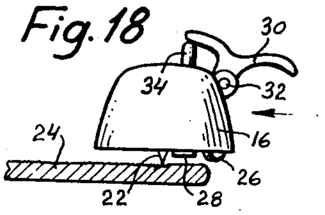
Figure 19:
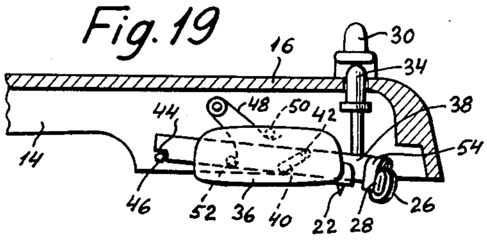
Figure 20:
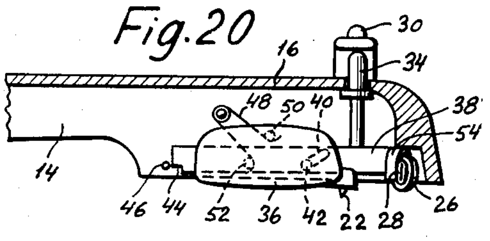
Figures 21, 22, 23:
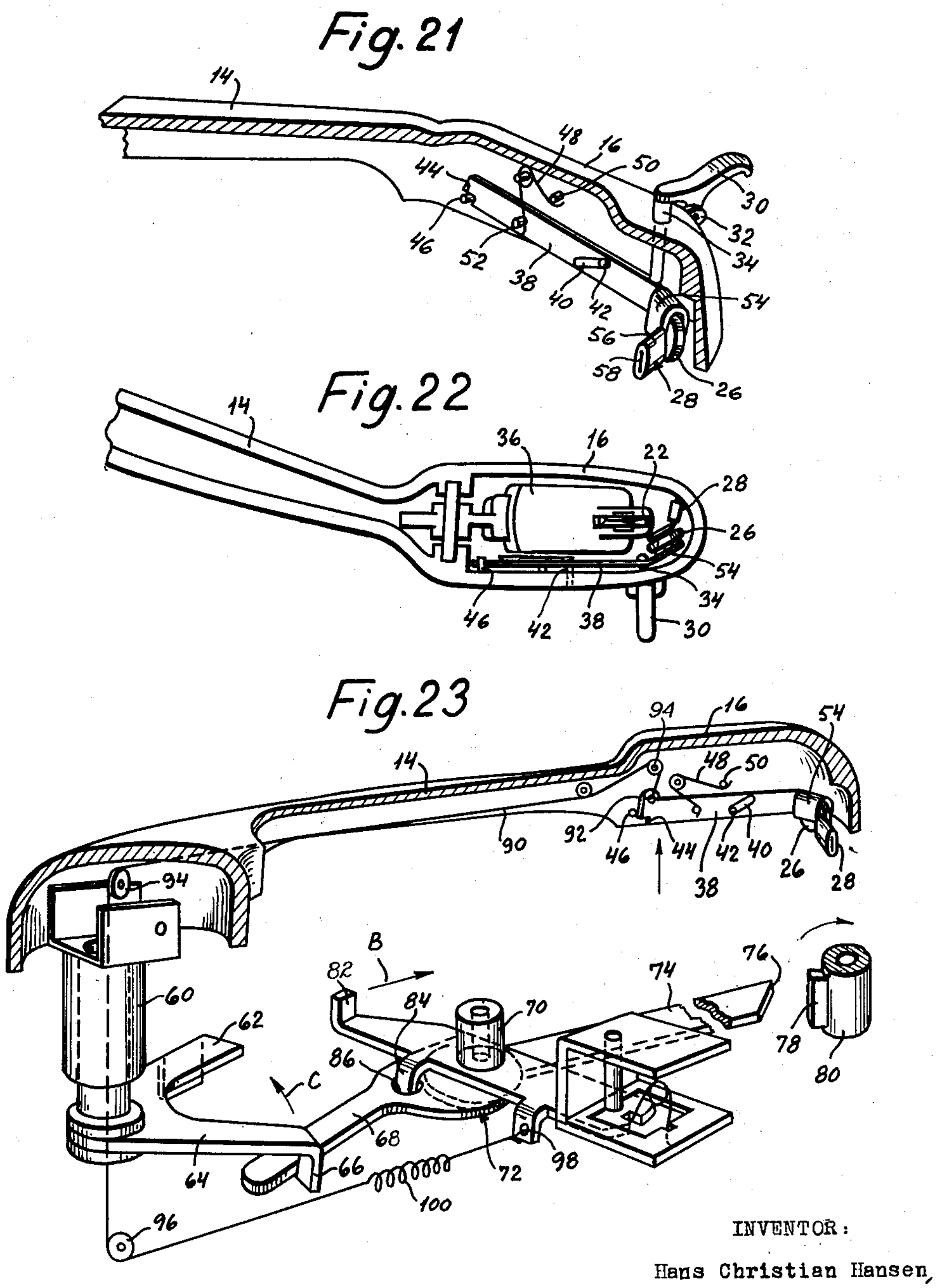
Figure 24:
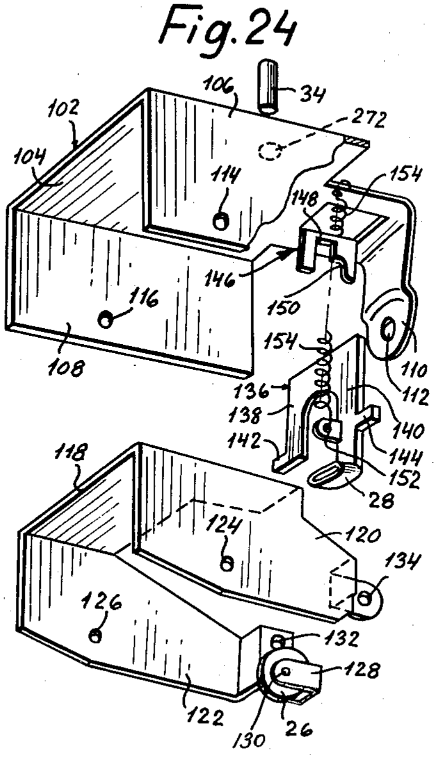
Figures 25, 26, 27:
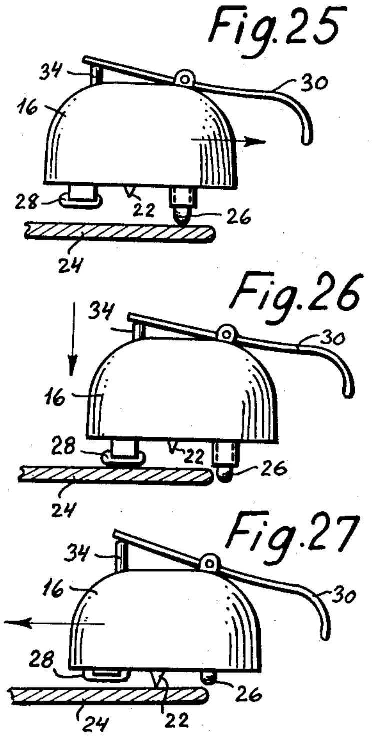
Figure 28:
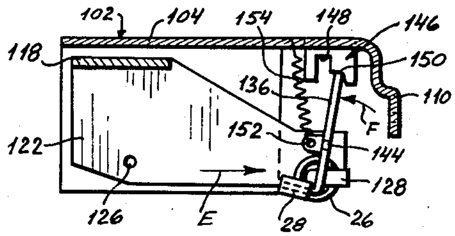
Figure 29:
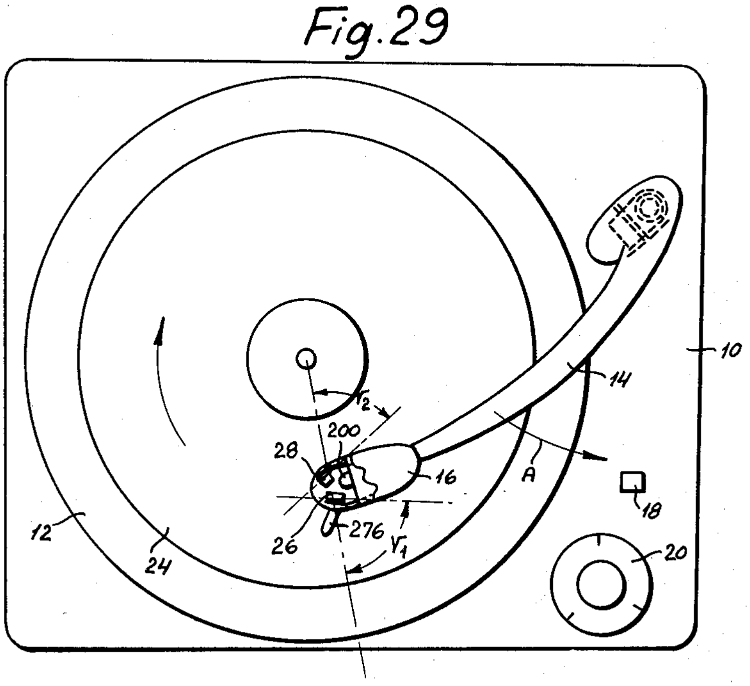
Figure 30:
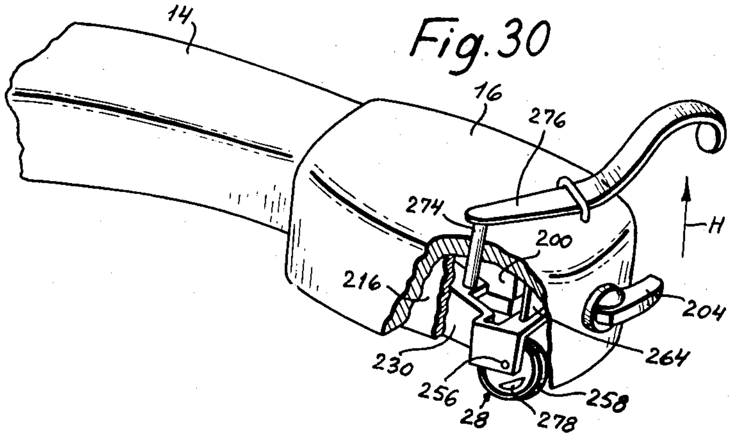
Figure 31:
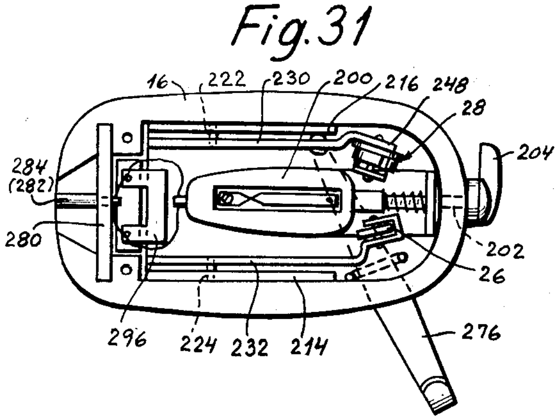
Figure 32:
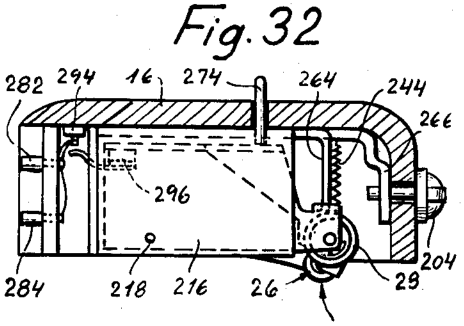
Figure 33:
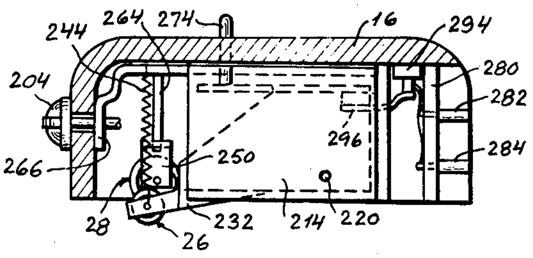
Figure 34:
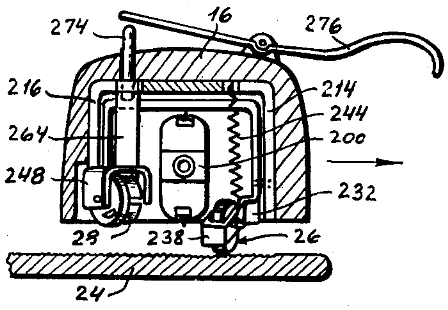
Figure 35:
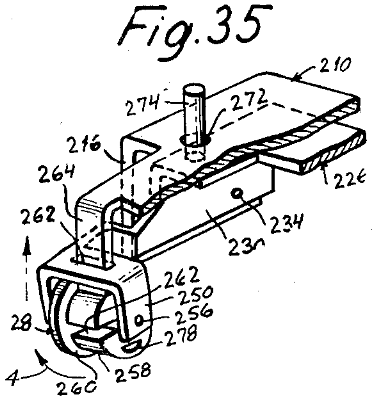
Figure 36:
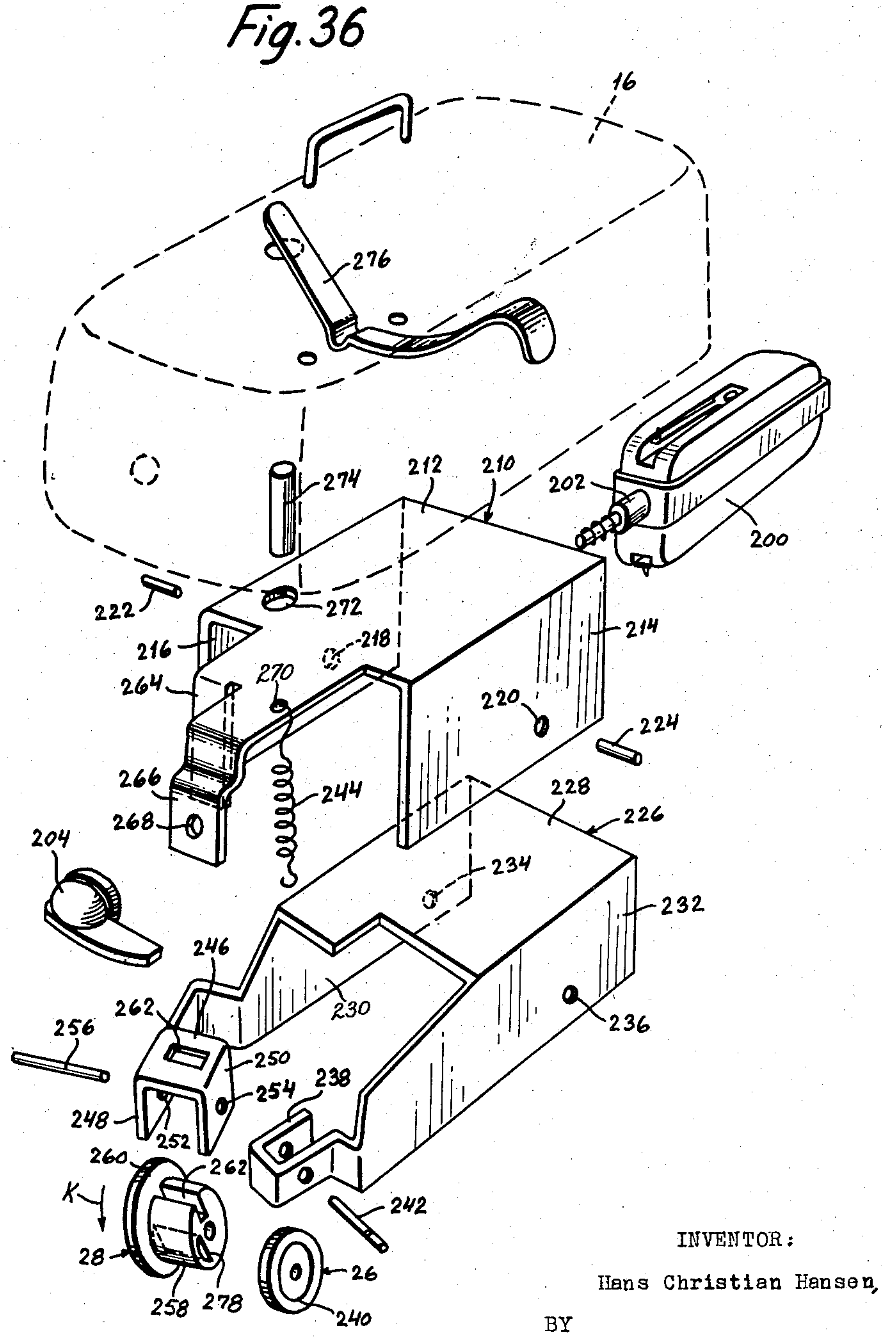
Figures 37, 38:
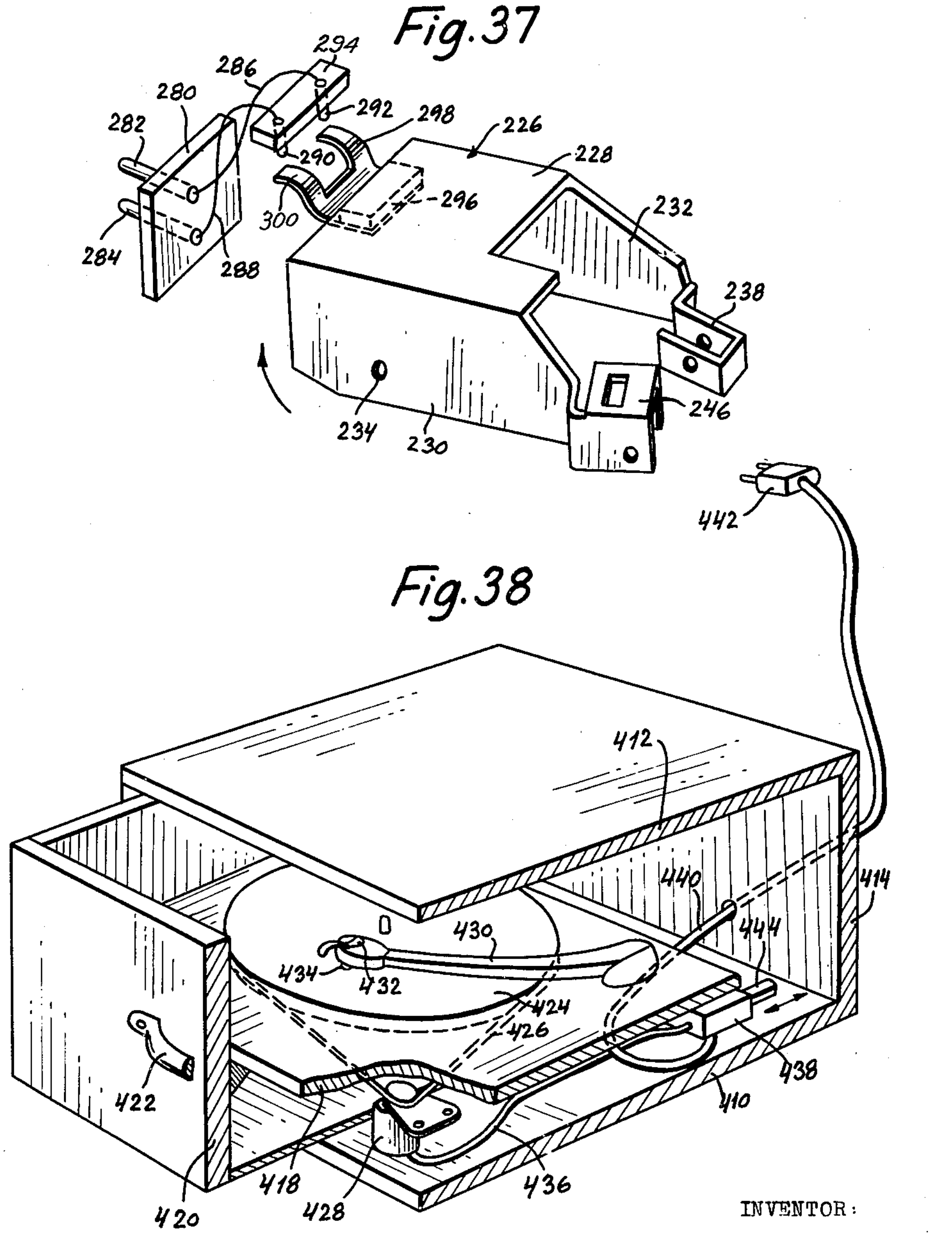
Figure 39:
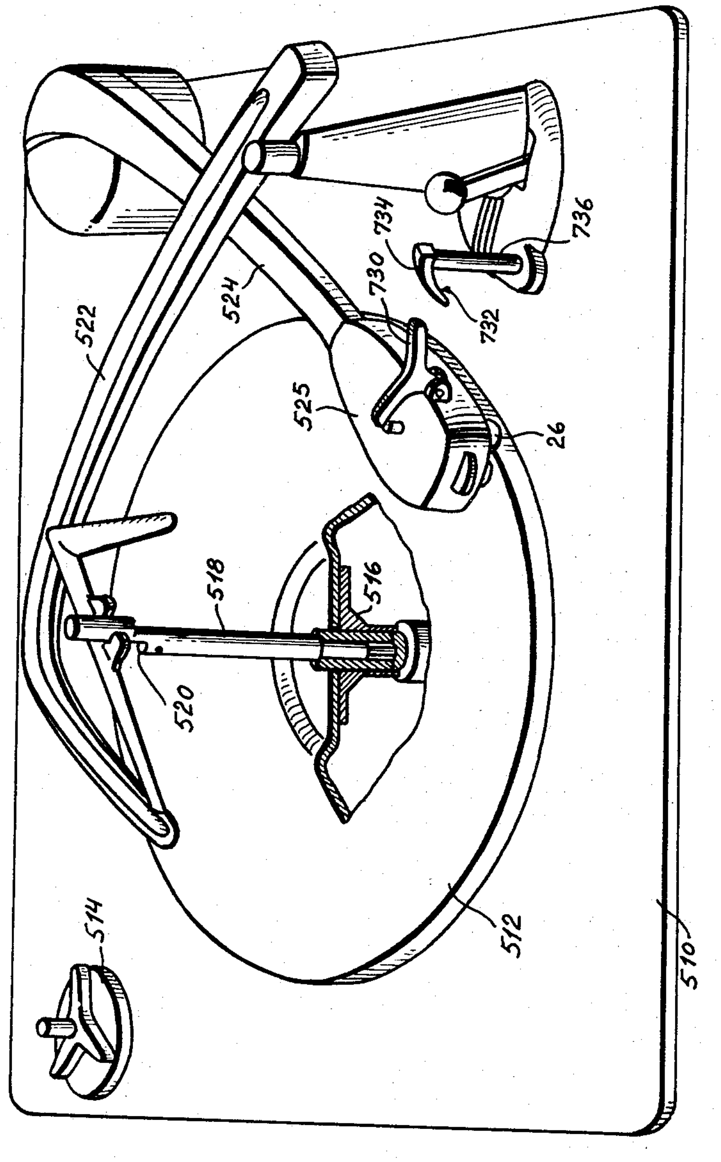
Figure 40:
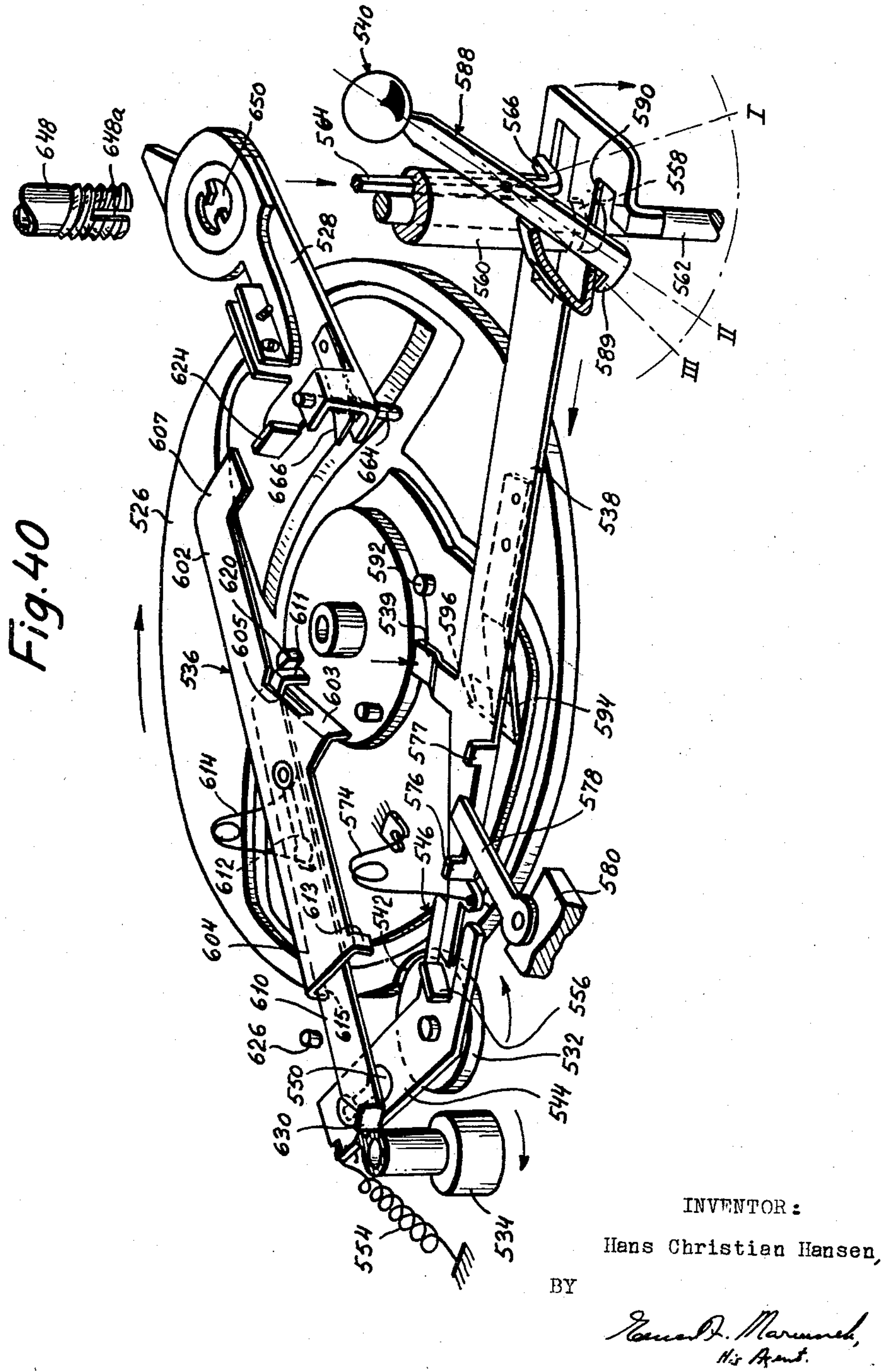
Figure 41:
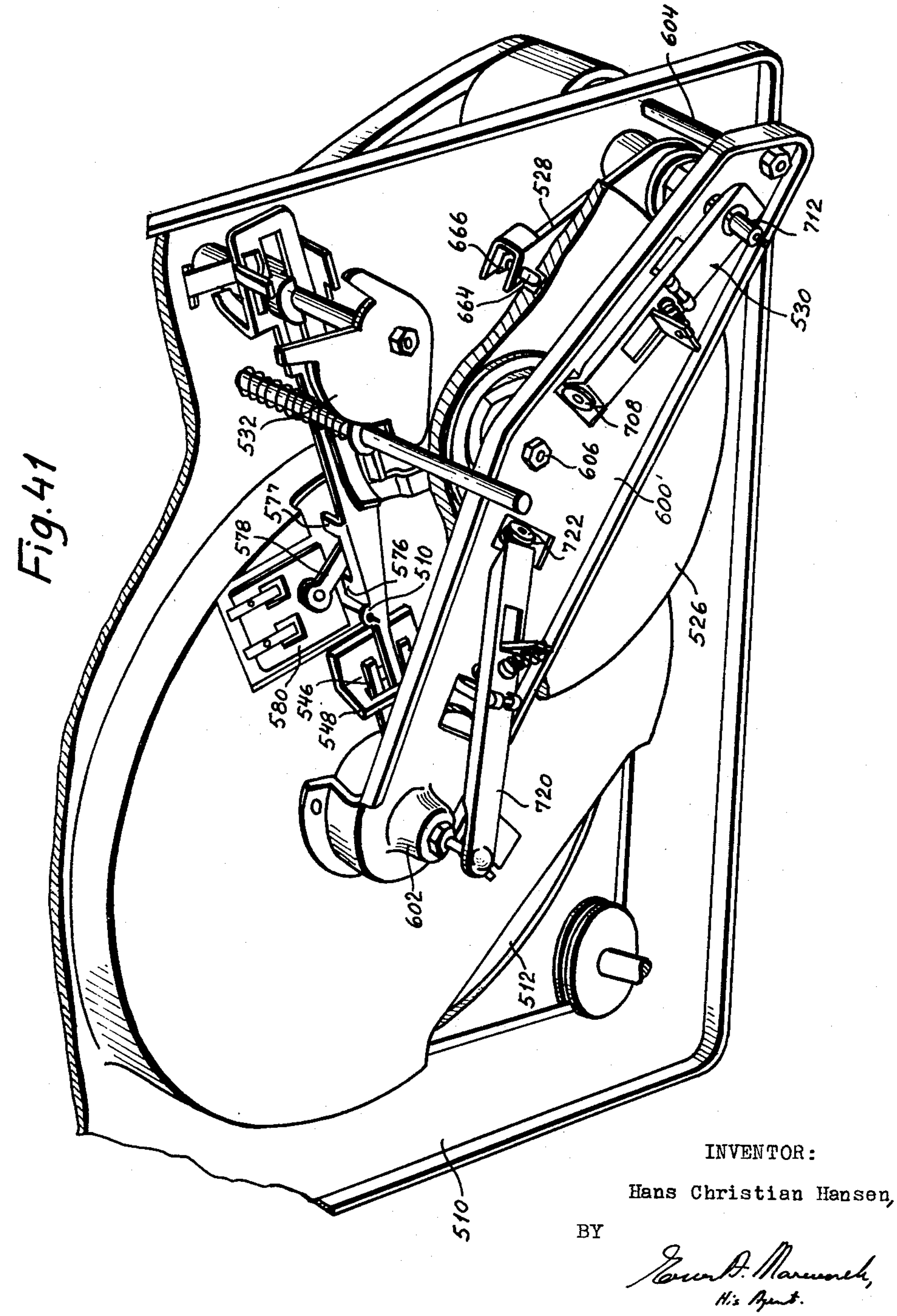
Figure 42:
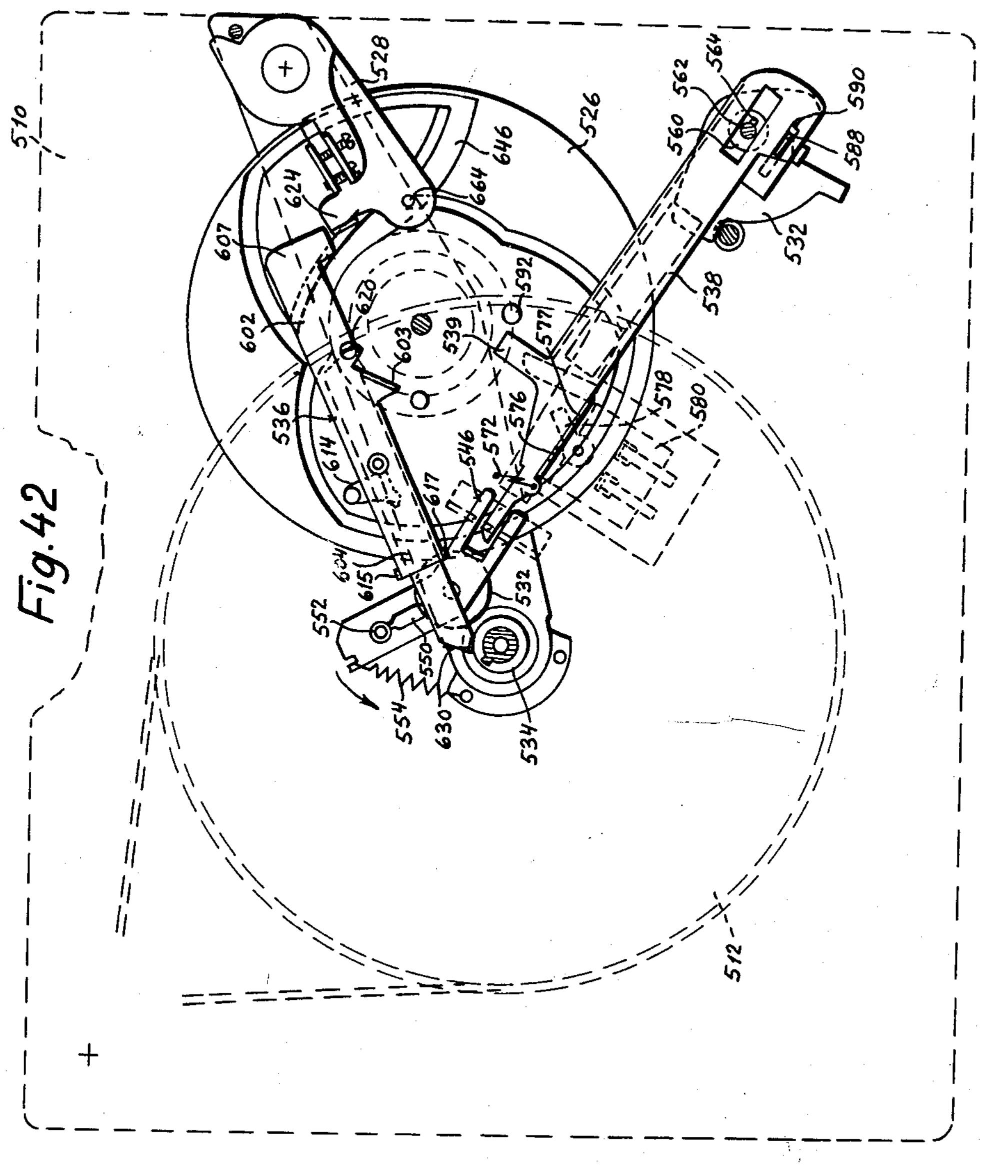

FIG. 7 is a plan view of the trip starting mechanism an appertaining parts of the embodiment shown in FIGS. 1–6, FIG. 8 is a vertical section through the mechanism shown in FIG. 7, FIG. 9 is a plan view of the cam mechanism of the embodiment shown in FIGS. 1–7, FIG. 10 is a diagram showing the pick-up movement cycle, FIG. 11 is a detail of the automatic switch-off mechanism of the embodiment shown in FIGS. 1–9 in vertical section, FIG. 12 is a perspective view of the pick-up arm in the embodiment shown in FIGS. 1–11, FIG. 13 is a partial elevational view of the edge portion of a stack of records in connection with the pick-up arm shown in FIG. 12 with the parts in one position, FIG. 14 is a partial elevational view of the pick-up arm and records in FIG. 13, with the parts in another position, FIG. 15 is a plan view of another embodiment of a phonograph according to the invention, FIG. 16 is an end view of the pick-up arm of embodiment of FIG. 15 showing the pick-up supported on the surface of the record in one position of the operation, FIG. 17 is the same view showing the parts in another position, FIG. 18 is the same view showing the parts in the last part of the operating position, FIG. 19 is a section through the pick-up arm showing the parts in a projecting position, FIG. 20 is the same section showing the parts in a retracted position, FIG. 21 is a perspective view of the parts shown in FIGS. 19 and 20, FIG. 22 is a plan view of the pick-up of the embodiment of FIGS. 19 through 21, seen from the bottom, FIG. 23 is still a further embodiment of the mechanism as shown in FIGS. 19 through 22, showing a specific embodiment of the mechanism for releasing the pick-up support to the operative position, FIG. 24 is a perspective exploded view of the parts in a modified embodiment showing all parts drawn out, FIGS. 25–27 are views corresponding to the views of FIGS. 16–18, showing the embodiment of FIG. 24 in three different operative positions, FIG. 28 is a vertical through the embodiment of FIG. 24, FIG. 29 is a plan view of still another embodiment of the invention, FIG. 30 is a perspective view partly in section of a further embodiment of the invention, FIG. 31 is a plan view of the mechanism shown in FIG. 30, seen from the bottom, FIG. 32 is a section through the embodiment of FIG. 31, seen from the left hand side, FIG. 33 is a similar section seen from the right hand side, FIG. 34 is a sectional end view of the embodiment shown in FIGS. 30–33, FIG. 35 is a perspective detail of the embodiment of FIGS. 30–34, showing the friction member, FIG. 36 is a perspective exploded view of the parts of the embodiment in FIGS. 30–35, drawn out in spaced relationship, FIG. 37 is a perspective exploded view of a detail of a contact arrangement applicable to any of the embodiments shown, FIG. 38 is a perspective view partly in section of a phonograph movably arranged in an article of furniture combined with at one arm indexing apparatus or track finder, FIG. 39 is a perspective view of a record changing phonograph having a record indexing apparatus or track finder, FIG. 40 is a perspective view of the cam mechanism with some of the appertaining parts of the record changing phonograph in FIG. 39, seen from the top side, FIG. 41 is a perspective view of the cam mechanism with some of the appertaining parts of the record changing phonograph shown in FIG. 39, seen from the bottom side, FIG. 42 is a plan view of the operative parts in the phonograph seen in FIGS. 39 through 41, FIG. 42*a* is a plan view of the operative parts shown in FIG. 42 in the position of rest before starting of the phonograph.

Figure 43:
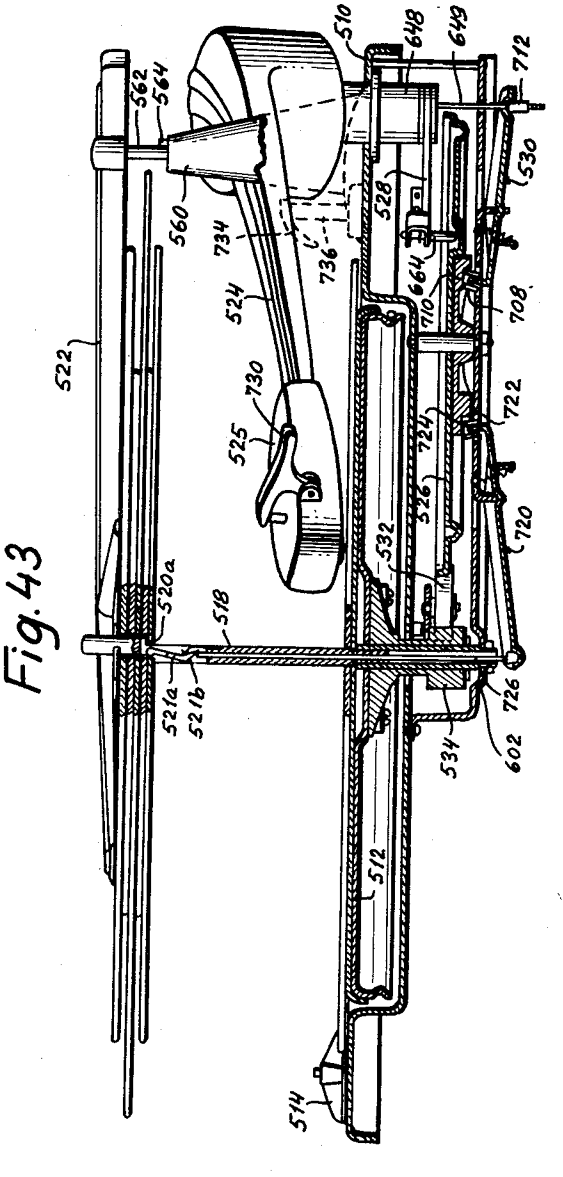
Figure 48:
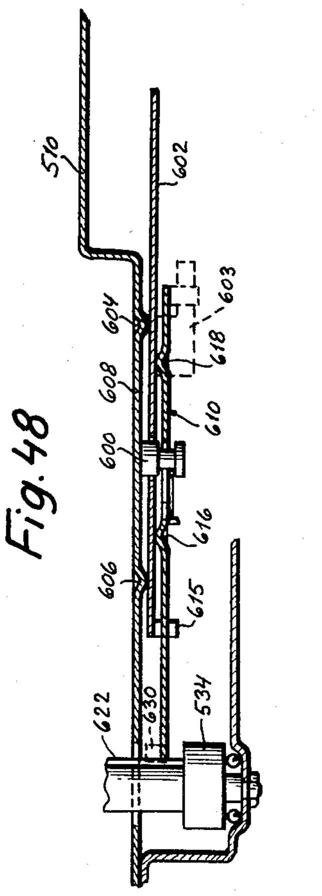
Figures 44, 45:
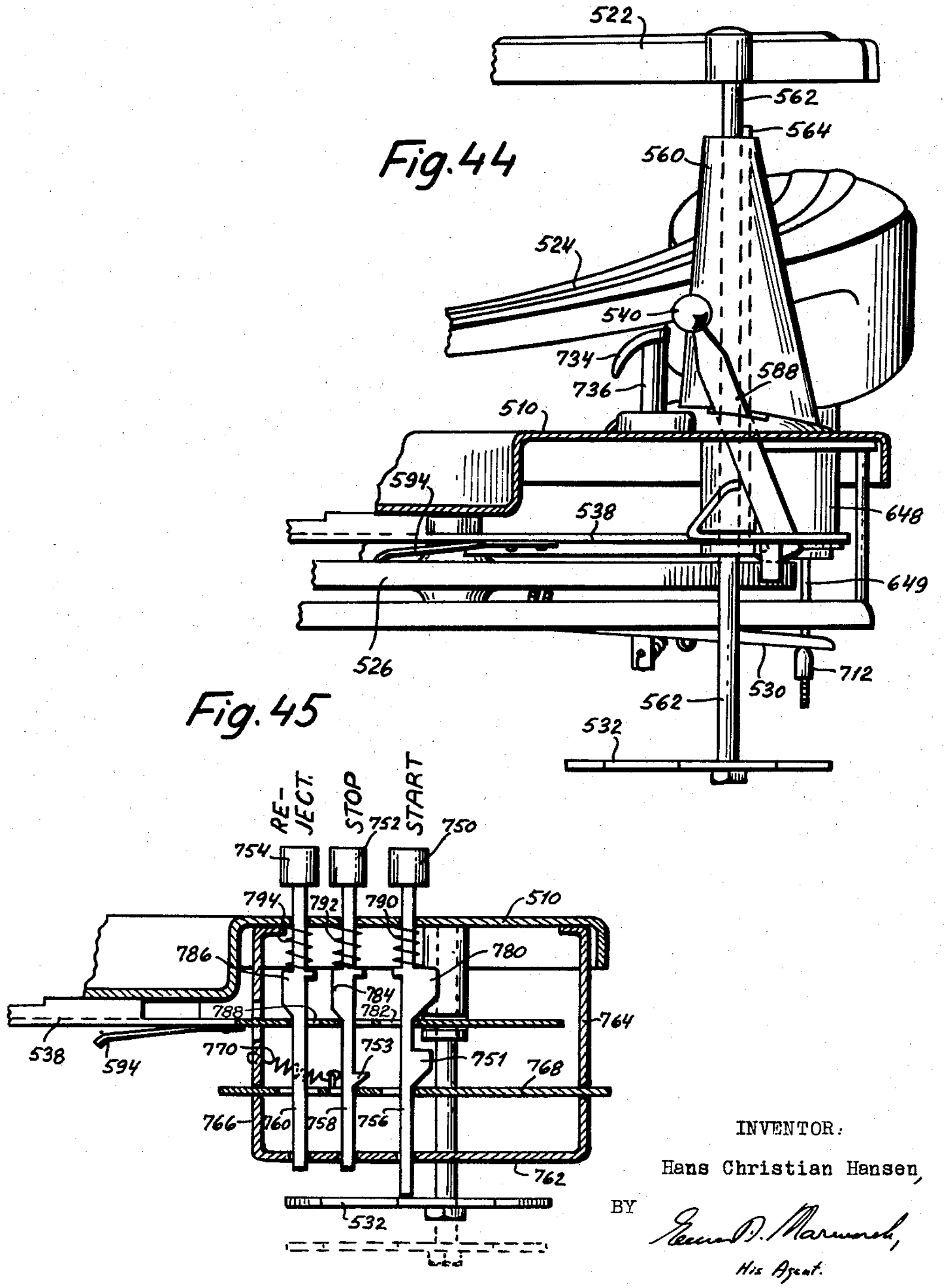
Figure 46:
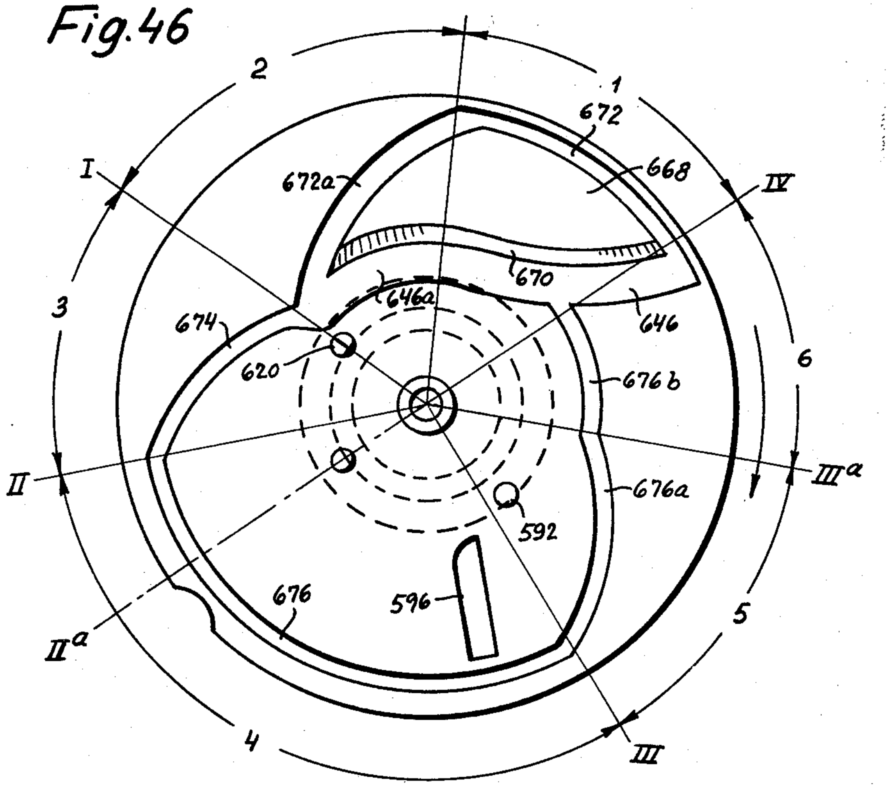
Figure 45A:
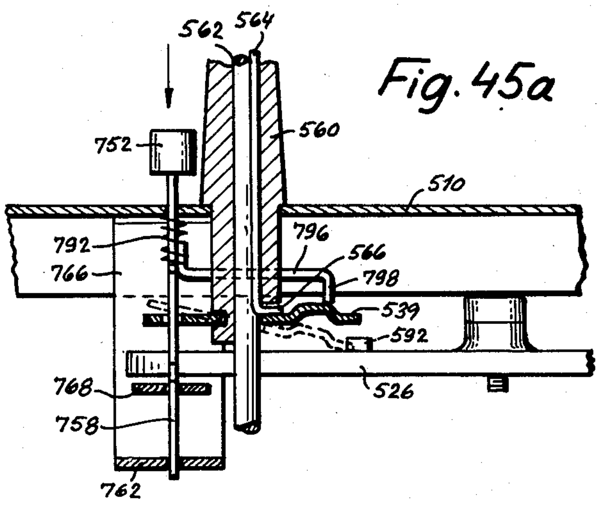
Figure 47:
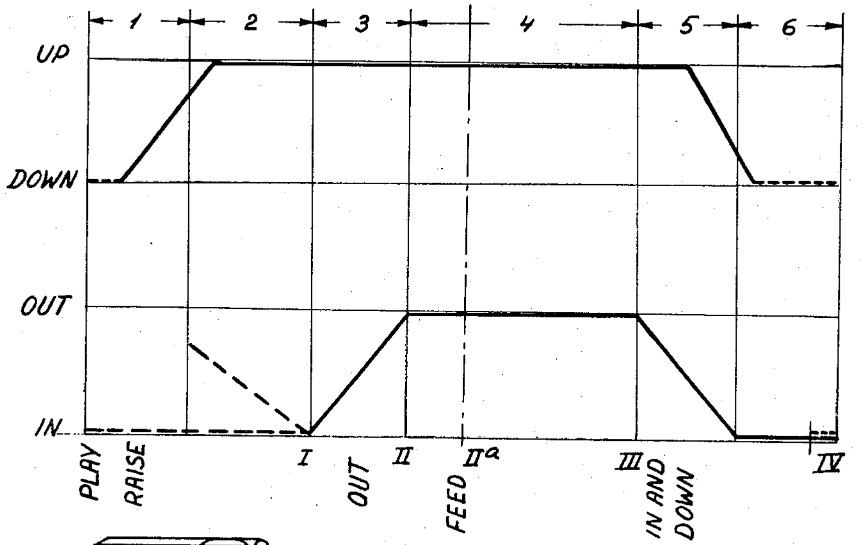
Figure 49:
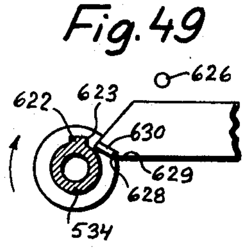
Figure 50:
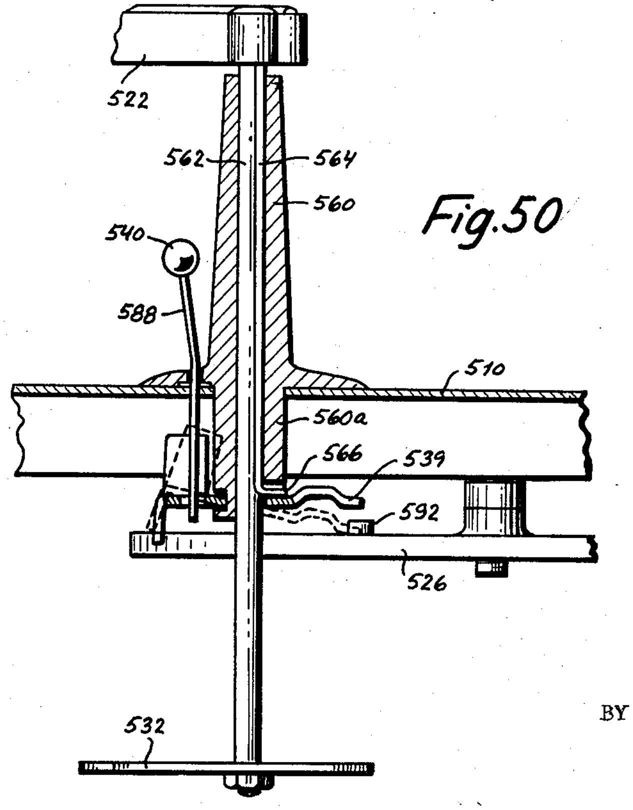

FIG. 43 is a vertical section through the phonograph seen in FIGS. 39–42,

FIG. 44 is a vertical section through a part of the phonograph seen in FIGS. 39 through 43 in one embodiment, FIG. 45 is a vertical section through a part of the phonograph seen in FIGS. 39 through 43 in another embodiment, FIG. 45*a* is a fragmentary sectional view through a part of the phonograph, FIG. 46 is a plan view of the cam member of the phonograph according to FIGS. 39 through 44, FIG. 47 is a diagram showing the tone arm movements of the phonograph shown in FIGS. 39 through 44, FIG. 48 is a vertical section through the trip starter mechanism of the phonograph shown in FIGS. 39 through 44, and FIG. 49 is a plan view of the details of the arrangement shown in FIG. 48, and FIG. 50 is a vertical section through the stabilizer arm bearing perpendicular to the control member.

In the embodiment illustrated **16*a* is a base plate or panel. Above the top surface of the base plate, there extends the top surface of a turntable 110*a* adapted to rotate on a spindle 190*a*. Reference numeral 112*a* designates a pick-up arm arranged for automatic movement in a manner which will be more fully described in the following. The pick-up is provided with a stylus member 100*a* (FIG. 12) to engage the sound track of a phonograph record and a further element is a record stabilizing element 114*a* adapted to engage the top surface of the uppermost record of a stack, which is supported on the central spindle 190*a* and allowed to be fed one after the other to the playing position on the turntable 110*a*. These main elements are shown in plan view in FIG. 1. The turntable may be partly embedded in a recess in the base plate so that only its surface extends above the surface of the base plate. The turntable 110*a* is driven by a flexible belt 624*a* from a pulley 622*a*. A sidewardly extending recess 120*a*** between the front edge of the base plate and the turntable allows a finger to be introduced under a record resting on the turntable to lift it away therefrom.

The driving mechanism, which is not shown in the drawing, comprises an electric motor of any suitable kind, preferably a motor which is changeable between different speeds so as to drive the turntable alternately with 78, 45 and 33⅓ revolutions per minute, which drives the pulley **622*a***.

Below the general base plate **116*a*, which will be found in part in most of the FIGURES 1 through 10, there are arranged two crossing rails 134*a* and 136*a*. The ends of the rail 134*a* are by means of screws 138*a* and 140*a*, see FIG. 5, connected to a pedestal 142*a* extending below the base plate 116*a* near one edge thereof. The rail 134*a* extends under the centre of the turntable 110*a*, see more specifically FIG. 2. The other end of the rail 134*a* is provided with a hole 146*a*, through which a screw (not shown) secures this end of the rail to the base plate spaced therefrom by a distance element (not shown). The rail 136*a* crosses the direction of the rail 134*a* under the centre of the turntable 110*a*. In FIG. 2 the front end of the rail 136*a* is shown in connection with the distance piece 150*a* securing the rail 136*a* under the base plate in spaced relationship thereto. A similar distance piece not shown, is arranged at the other end of the rail 136*a*. Here a screw hole 148*a*** is shown.

As shown in FIGURE 2 the turntable is rotatably arranged on a central pin at the intersection point between the rails **134*a* and 136*a*. Below the turntable is secured a bushing 158*a*** having a roughened surface engaging the driving element for the phonograph mechanism.

The driving element for the phonograph is a driven roller **164*a* which is freely rotatably arranged on an arm 166*a* by means of a pin or the like. The arm 166*a* is provided with an elongated slot 168*a* having a circular extension 169*a* adapted to receive a pin 170*a* secured to the bottom of the base plate 116*a* and extending therebelow. The pin 170*a* is provided with an annular groove so as to allow the arm 166*a* to be carried suspended on the pin 170*a*. The arm 166*a* is kept in position by means of a slidably arranged lever 172*a* which is guided below the panel plate 116*a* by means of a slot 177*a*, which is supported in a recess on a bushing 178*a*, which forms a bearing for a spindle 180*a* for the element 114*a*. The arm 172*a* is kept in substantial parallel alignment with the base plate by means of a spring 183*a* secured to the base plate and gripping below the edge of the arm 172*a*. The arm 172*a* is connected with the arm 166*a* by means of a slot and pin connection 187*a***.

The pick-up arm 112a is pivotally arranged in a bushing secured to and extending as well above as below the base plate. There is arranged within the bushing a hollow spindle 248a, FIGS. 12–14, having in any convenient manner an adjustable connection with the pick-up arm. In the interior of the hollow spindle 248a, there is arranged a spindle 260a, FIG. 5, having its top end secured to the end of the pick-up arm so as to raise and lower the pick-up arm by vertical adjustment of the spindle 260a. At the lower end of the hollow shaft 248a there is arranged an arm 250a, see FIG. 7, carrying at its free end a pin 252a. It will be understood that by swinging the arm 250a, the hollow shaft 248a will rotate so as to swing the pick-up arm. The pin 252a is arranged to cooperate with a cam track on a cam disc 144a, FIGURE 3. The lower end of the spindle 260a extends through an aperture in the rail 134a below which a two-armed lever 254a, 256a, see FIGURE 5, is arranged pivotally on a pin. The spindle 260a extends through this lever and is, below the lever, provided with a nut 262a. The lever 254a, 256a is arranged to cooperate with another cam track on the cam disc 144a to raise and lower the pick-up arm. Preferably a cam track engaging roller 258a is arranged to cooperate with the cam track portion, which is shown in FIGURE 5 at 266a.

The record support is in form of a pin 190a (FIG. 2) provided with a shoulder and loosely arranged in a central bore in the bearing for the turntable. The central guiding and supporting pin comprises two offset cylindrical portions having therebetween an inclined portion 195a, on the top of which the shoulder is provided so as to allow a record to be released from the shoulder by imparting a sideward movement to the record.

The movements of the tone arm are, in a manner to be more fully elucidated in the following, effected by the rotation of the cam disc 144a, which is driven from a bushing or roller 158a on the turntable spindle through the driven roller 164a. This roller 158a is brought into its driving engagement with the spindle and the cam disc by a movement of the arm 172a in the opposite direction of the arrow A as shown in FIGURE 2. In the playing position of the mechanism a recess 322a, see FIGURE 7, in the periphery of the cam disc 144a will be in position opposite the driving roller 164a so as to receive the same when the supporting member for the driving roller by means of a spring (not shown) urges the roller 164a into the recess 322a. In this position the roller is thus out of driving engagement with the turntable spindle 158a. A small rotation of the cam disc caused by the trip starter or in another way to be described will force the roller 164a up on the surface of the cam disc so as to reassume its driving position.

The different cam tracks are provided on the bottom side of the cam disc, see more specifically FIGURES 3 and 9. These cam tracks are, more specifically with reference to FIGURES 9 and 10, for effecting the horizontal and vertical movement of the pick-up arm: a broad cam track 272a, in which the pick-up arm pin 252a moves during the playing position. The appertaining cam surface controlling the vertical pick-up arm movement is in the form of a recess 261a corresponding to a lowered pick-up arm. Hereafter follow the different cam portions in sequence: A vertical control arm portion 263a corresponding to raising the pick-up arm, an outwardly guiding portion 273a for moving the pick-up arm to its outer position with the pick-up in its raised position.

The following cam tracks will be described in the sequence by which they are passed by the pin 252a during rotation of the cam disc, which takes place in the direction of the arrow 8 shown in FIG. 9. The broad cam track 272a narrows into a cam track 274a at the entrance of which there is provided an outwardly guiding portion 273a for moving the pick-up arm outwardly.

Hereafter follows a section 275a corresponding to inward movement of the pick-up arm into a position, which is not the same as that from which the raising and outward movement of the pick-up starts. Hereafter the pick-up is again moved outwardly in the raised position with the roller 258a, FIGURE 5, moving on the section 266a, FIGURE 9. The guiding surface comprises two resilient members $\mathbf{284a_1}$ and $\mathbf{284a_2}$ respectively, each closing the entrance of cam tracks $\mathbf{282a_2}$ and $\mathbf{282a_3}$ respectively. The resilient members consist of wire springs arranged through holes in the cam disc and having on the top of the cam disc bent portions secured at their ends. An exterior cam track $\mathbf{282a_1}$ has its entrance normally open. The three cam tracks $\mathbf{282a_1}$, $\mathbf{282a_2}$ and $\mathbf{282a_3}$ correspond to records of different sizes and follow identical curves. The initial portions are concentric with the cam disc. Hereafter follow eccentric portions corresponding to slight inward movement of the pick-up. The three cam tracks have bends at $\mathbf{287a_1}$, $\mathbf{287a_2}$ and $\mathbf{287a_3}$ corresponding to slight inward movement and after these bent portions the three cam tracks continue in slightly inwardly directed portions $\mathbf{289a_1}$, $\mathbf{289a_2}$ and $\mathbf{289a_3}$ terminating in the broad cam track 272a. As will be seen from the up and down movement curve in FIG. 10 the pick-up is initially raised to a position slightly below its maximum raised position, thereafter raised to its maximum position and at last lowered to engage the next record when the pick-up is moved inwardly in the last cam portion. The numerals 265a, 266a and 267a of the cam track 263a indicate cam portions guiding vertical movements of the tone arm, and the unnumbered sections of the cam track 263a are level.

The various sections of the cam disc shown in FIGURE 9 and the appertaining movements of the tone arm, which are schematically shown in the diagram of FIGURE 10 are referred to by the letters *z, u, v, x, y*.

The positioning element or ballast arm 114, FIGURE 2, which serves to keep the records in horizontal position supported on the shoulder of the central spindle 190a is in the form of an arm having side ribs carrying an adjustable plate 194a having a hole 192a for passage of the top end of the spindle 190a.

The spindle 180a, which carries the member 114a extends through the bushing 178a and carries at its lower end a disc 196a which is shown in FIGURES 2 and 4. At one side this disc is provided with a circular recess 198a extending from the top of the disc leaving a rib at the bottom of the disc. Substantially opposite there is a further recess 200a extending from the bottom side of the disc leaving adjacent the top side a rib. At one end of the recess 200a there is a passage 202a parallel with the spindle 180a. The recess 200a communicates with a vertical pin 204a secured to the base plate. This pin is provided with an annular groove 206a, see FIGURE 3. It will be understood that when the spindle 180a is raised it can be kept in raised position by passing the rib above the groove 200a into the recess 206. The parts are so arranged that the raising and lowering of the spindle takes place in the position only, in which the member 114a is substantially radial over the stack of records. It will further be understood that the angle of rotation is controlled by the angle of the recess 200a which will be substantially 90°.

Engageable with the recess 198a is arranged a nose 209a, see FIGURE 2, on a pivotable arm 208a carried by a pin 211a. This arm 208a is provided with a pin engaging in a notch 193a in the arm 172a. The arm 208a is further provided with an extension 176a engaging in a slide member for an electric switch 212a, see FIGURE 3. It will be understood that when the member 114a is swung to the position outside the stack of records the arm 208a, 176a will be swung in one direction to switch off the motor, while swinging of the member 114a into its operative record engaging position will effect switching on the motor. A spring 213a interposed between the arm 208a, 176a and the base plate will assure movement of this arm in the form of a toggle switch movement.

The spindle 180a is provided with a shoulder 179a, see FIGURE 11, which is allowed to cooperate with one side of the slot 177*a*, see FIGURE 3, in the arm 172*a* so as to impart to the arm a slight tilting movement allowing an abutment 301*a* on arm 172*a* to be brought within the path of an abutment or the like 310*a* on the cam disc, see FIGURE 11.

Associated with the arm 250*a* controlling the in- and outward movement of the pick-up arm there is arranged a short arm 251*a*, FIGURES 6 and 7, forming an angle with the arm 250*a*. Between the two arms there is arranged a pivotable lever 302*a*, which at its end at 300*a* is bent downwardly with a portion adapted to be engaged by either of the two arms 250*a* and 251*a*. The other end of the lever 302*a* is provided with a disc-formed portion 305*a* secured to a spindle 307*a*. This spindle is rotatably supported hanging in a bushing 309*a* secured to the bottom of the base plate 116*a*. The bushing is provided with a recess 311*a* extending into the bushing to communicate with the central bore thereof in which the spindle is allowed to rotate. To suspend the spindle in the bushing, the spindle is provided with an annular groove 219*a* adapted to be engaged by one end of a spring 324*a*, the one branch of which surrounds the bushing, while its outer branch is arranged in the recess 311*a*, to engage the annular groove 219*a*. It will thus be understood that the spindle 307*a* is freely suspended in the bushing to allow the lever 302*a* to pivot about the axis of the spindle with very small friction. Below the disc-formed portion 305*a* there is on the spindle 307*a* secured a further disc 315*a* spaced from the disc 305*a* a distance which is slightly greater than the thickness of a lever 206*a* interposed between the discs 305*a* and 315*a*. Here the friction between the levers 302*a* and 206*a* is obtained by means of the weight of the lever 206*a* due to the fact that it is freely pivotable about the spindle with a small vertical play in the gap between the discs 305*a* and 315*a*. The lever 206*a* is provided with a longitudinal slot 209*a*. Further the lever is provided with an extending portion 311*a* the end of which has a downwardly bent part at 313*a*. Between the end of this extension and the spindle 307*a* a relatively weak spring 317 is arranged, which in the normal position of the parts will keep the tip 306*a* of the lever 206*a* adjacent the path of the rotating nose 308*a*. By mounting the parts to secure a uniform friction between the levers 302*a* and 206*a* the disc 315*a* is preferably clamped on the spindle with the lever 206*a* in position together with the interposition of a thin plate, which after the mounting of the disc 315*a* is removed to allow the necessary vertical play between the two levers.

It will be understood that by this construction it is possible to secure a very low friction as well between the spindle 307*a* and the bushing as between the two levers. The latter friction will be the smallest. This construction of the trip starter mechanism has the advantage that it will be extremely sensible and allow trip starting to be effected by the cooperation between the rotating nose 308*a* and the tip of the lever 206*a* event under such circumstances, viz. form of the end groove in the record to be played, for which other embodiments of a trip starting mechanism will fail.

On the pick-up arm there is as most clearly illustrated in FIGURES 12, 13 and 14 arranged a small wheel 400*a* arranged to rotate freely on a pin 402*a*. Preferably this wheel is arranged on an offset portion of the pick-up arm. On the top of the pick-up arm there is arranged a knob 404*a* spaced from the wheel so that the knob is slightly nearer the centre of the record than the top of the wheel. The top of the knob 404*a* is provided with a small frictional member 403*a*, for instance, of rubber. The top of the wheel extends slightly above the top of the frictional member 403*a*. The wheel is preferably freely rotatable, for instance, by being supported in a convenient low frictional bearing.

The mode of operation is as follows:

In the position of rest the pick-up arm is in a position swung outside the periphery of the turntable with the pin 252*a* lying in the cam track portion 274*a*. Also the member 114*a* is swung to its most outward position. By swinging the member 114*a* in, preparatory to lower it to engage the stack of records supported on the shoulder of the central guiding pin, the switch control arm 176*a* will be swung to start the motor and simultaneously the arm 172*a* will be moved in a direction opposite the arrow A in FIGURE 2 to clamp the driving roller 164*a* between the bushing 158*a* on the turntable and the cam disc. Considering that the motor as indicated in FIGURE 2, drives through a pulley the turntable, the cam disc will here start to rotate in direction of the arrow shown. This will with reference to the curves of FIGURE 10 move the pick-up arm inwardly by passing the roller 252*a* in the cam track portion 275*a* simultaneously raising the pick-up to engage with its roller 400*a* the bottom of the lower-most record in a stack.

If the lowermost record is a 12 inch record, the wheel 400*a* will rotate with very little friction the whole way along the bottom side of the record with the result that the pin 252*a* will be guided along the two springs 284*a*$_2$ and 284*a*$_1$ into the entrance of the exterior cam track 282*a*$_1$. If the lowermost record is a 10 inch record, the wheel 400*a* will escape from its engagement with the bottom surface of the record when it passes the edge thereof. This will bring the small friction knob 403*a* into engagement with the bottom of the record surface. This escape will take place in the position of the pin 252*a* just having started to slide along the spring 284*a*$_1$. The tension of this spring is so adapted to the friction between the knob 403*a* and the record surface that this friction will overcome the spring tension bending the spring 284*a*$_1$ to open the entrance to the intermediate cam track 282*a*$_2$.

In a similar manner a releasing of the wheel 400*a* from the bottom surface of a 7 inch record will effect yielding of the spring 284*a*$_2$ opening the entrance of the interior cam track 282*a*$_3$.

It will thus be understood that in the manner here described the guiding pin 252*a* will automatically be guided in the right one of the three cam tracks corresponding to the three different sizes of records to be played.

When guided in the right cam track the pick-up will be moved inwardly to engage with the knob 404*a* against the edge of the lowermost record, the size of which has been tested in the manner just described. The passage of the roller 252*a* in either of the bent cam track sections 287*a*$_1$, 287*a*$_2$ or 287*a*$_3$ will effect a pushing of the lowermost record away from the supporting shoulder of the central guiding spindle, whereafter the pick-up will again be moved slightly outwardly and thereafter inwardly and down to engage the top surface of the record in normal manner.

During the playing period the pick-up is allowed to move freely in the broad cam track portion 272*a*. The cam disc is stopped thereby that the driving roller 164*a* is brought into engagement with a recess 322*a*, see FIGURE 7, in the periphery of the cam disc and is thereby disengaged from the bushing 158*a* as previously described.

During the playing the arm 251*a* associated with the pick-up arm will give the lever 302*a* a slight movement in anti-clockwise direction in accordance with the pitch of the sound track, thereby also giving the lever tip 306*a* a similar slight movement. The rotating nose 308 will push the lever 206*a* back during each rotation. This movement will not be transmitted to the lever 302*a* due to the fact that the lever 206*a* is freely rotatable on the spindle 307*a* in the gap between the two discs 305*a* and 315*a*, only with the friction of its own weight. When the pick-up stylus member is moved in the end track of the record, an increased movement of the two levers 302*a* and 206*a* will bring the tip 306*a* into engagement with the rotating nose 308*a*, thereby swinging the lever 206*a*. During this movement a spring 320*a* on the lever 206*a* will be tightened and when the nose 308*a* relieves the tip 306*a* the resilient action of the spring will move the tip of the lever 206a away from the path of the rotating nose 308a. Simultaneously a bent portion 316a of the spring 320a will be engaged by a cam member 314a thereby imparting to the cam disc a push to start its rotation; the cam member 314a will owing to this impact swing the lever system away from the centre so as to definitely prevent the lever 206a from again being brought into engagement with the rotating nose.

When the last record has been played, the vertical spindle of the horizontal arm 114a will slide downwardly thereby bringing its off-set shoulder 179a into engagement with the lever 172a to tilt it as shown in FIG. 11. The projection 310a on the top of the cam disc 114a, which is arranged so as to engage the downwardly directed projection 301a on the lever 172a in the position of rest of the different parts will then push the lever in the direction of the arrow A, see FIGURE 2, thereby actuating the switch arm. The connection between the lever 172a and the arm 166a is by means of a pin and slot 127a.

It may be convenient to allow a manual changing of a record. To this purpose there is arranged, as shown in FIG. 6 on the top surface of the base plate, a push button 330a, which extends below the base and here is connected with a string or cord 332a guided through a hole in a bracket. The other end of the cord 332a is connected with a resilient member, such as a spring 334a, the one end of which at 335a is secured below the base plate and the free end of which is arranged with a downwardly extending portion 337a to engage the lever 206a. To prevent faults in case of wrong operation, for instance, pressure of the push-button during rotation of the cam disc, the spring 334a is made weaker than the spring 320a.

In the event that manual changing is desired, the push button 330a is push. Hereby the spring 334a with its downwardly extending end portion 337a engages with the lever 206 imparting thereto the same movement as when engaged by lever 302a.

In the following the different embodiments of FIGURES 15–50 will be described in detail.

FIG. 15 is a plan view of a phonograph seen from the top. The phonograph comprises a base 10 above which appears a turntable 12, a pivotable pick-up arm 14 having at its end a pick-up head 16, a stationary support 18 for the pick-up arm in its inoperative position and a control knob or the like 20 for adjusting the velocity of the turntable to different velocities, such as preferably 33⅓, 45 and 78 r.p.m.

The details of the phonograph are not shown. The phonograph may preferably be of the traditional type which is started by lifting the tone arm from the support 18 and moving it slightly outwardly and then inwardly. The pick-up is provided with a stylus member 22, see FIGURES 16 through 18 for engaging the sound track of a phonograph record 24 supported on the turntable.

In accordance with the invention the pick-up arm is provided with an arrangement adapted to keep the stylus member in spaced relationship from the surface of the record and carry the pick-up arm outwardly against the edge of the record whereafter said mechanism is released in a position to engage the stylus member with the record surface so as to introduce the stylus member in the initial portion of the sound groove of the record.

Basically said mechanism comprises a low friction member such as a roller or wheel 26, and a friction member 28.

Though in the embodiments to be described said mechanism is shown built into the housing of the pick-up itself, it will be understood that it might be built into the pick-up arm at any convenient place spaced from the pick-up.

As shown in FIGURES 16 through 18 the members 26 and 28 are movable between a projecting position in which the tip of the stylus member is kept in spaced relationship to the surface of the record 24 and a retracted position as shown in FIG. 18, in which the stylus member is allowed to engage the record surface.

As mentioned the low friction member 26 preferably is in form of a wheel or roller 26. As indicated in FIG. 15 said roller is arranged forming an angle $v$ with the radius between the centre of the record 24 and the point of engagement between the wheel or roller 26 and the record surface. The angle $v$ is so adapted to the velocity of the record that with the members 26 and 28 in the projecting position shown in FIGURE 16, the pick-up arm with the wheel or roller 26 in engagement with the record surface will be moved in a direction of the arrow A toward the edge of the record 24.

The low friction wheel or roller 26 projects slightly more than the friction member 28 so that the latter is free of the record surface as long as the low friction wheel or roller 26 engages the record surface When the wheel or roller 26 arrives at the edge of the record to the position shown in FIGURE 17, the supporting action will be taken over by the friction member 28. The mechanism is so constructed and arranged that the friction between the member 28 and the record surface will release both members from the projecting position in FIGURE 16 to the retracted position shown in FIGURE 18 with the result that the pick-up thereby will be brought nearer the record surface so as to engage the tip of the stylus member in the initial groove of the sound trace of the record. It will be understood that the radial distance between the low friction wheel or roller 26 and the stylus member is so selected that with the parts in the position shown in FIG. 17 the stylus member will be substantially above the first portion of the sound track of the record.

As furthermore shown in FIGURES 15 through 18 the pick-up arm is provided with a projecting arm or hook 30 adapted to lift the pick-up arm from the record and carry it outwardly when playing of the record has been terminated.

In accordance with one feature of the invention, said arm 30 is movable or is provided with a movable portion. In the schematic embodiment shown in FIGURES 16 through 18, the whole arm is in the form of a pivotable lever arranged to pivot about a point 32. It will be understood, however, that modifications in this respect will be possible within the scope of the invention so that the pivotable part of said arm 30 is hidden inside the stationary member extending to cover the pivotable arm itself. One end of said lever 30 is adapted to engage one end of a rod or the like 34. This arrangement serves the purpose of activating or actuating the mechanism hereinbefore described in such a manner that when a record has been played and the finger is placed under the arm 30 the mechanism is automatically released from the retracted position shown in FIGURE 18 to the projecting position shown in FIGURE 16.

This means that the pick-up arm simply can be left on any point of the surface of the next record to be played whereafter, by means of the action of the mechanism described, it will find its way by itself out to the edge of the record whereafter the stylus member automatically is brought into engagement with the sound track.

The mechanism, the function of which is described hereinbefore with reference to FIGURES 15 through 18, is in one embodiment more specifically shown in FIGURES 19 through 22. Here the pick-up cartridge is referred to by reference numeral 36. This cartridge may be of the piezo-electric type or the dynamic type.

In the embodiment shown in FIGURES 19 through 22 there is provided in the part of the pick-up arm forming the pick-up casing a lever or arm 38 having an inclined slot 40 through which extends a guiding pin 42 secured inside the pick-up casing. The rear end of the arm 38 is provided with a shoulder 44 adapted to engage a pin 46 in the position of the arm shown in FIGURES 19 and 21 with the pin 42 in the front top end of the slot 40. This is the projecting position of the mechanism as most clearly shown in FIGURE 19. In this position a spring 48, which engages a stationary pin 50 in the housing and a pin 52 on the arm 38 is keeping the shoulder 44 in engagement with the pin 46.

As shown in FIGURE 20 the parts are in the retracted position with the pin 42 in the lower rear end of the slot 40 and the rear end of the arm with the shoulder 44 lowered to engage the pin 46 with the end of the arm 38.

As will be understood from FIGURE 20 lifting of the pick-up arm with the finger under the lever 30 will press the rod 34 downwardly which will press the front end of the arm 38 to allow it to move slightly backwardly and downwardly into the projecting position shown in FIGURE 19.

At the front end the arm 38 is provided with a bifurcated member 54 forming a bearing for the low friction wheel or roller 26, which is mounted freely rotatable by means of a small pin or shaft (not shown). The friction member is in the form of a rubber sleeve or the like 56 pushed over an arm 58 extending sidewardly from one leg of the bifurcated member 54.

The operation of the device here described has already been elucidated with reference to FIGURES 15 through 18.

In the embodiment shown in FIGURES 19 through 22 the releasing of the mechanism from the retracted to the projecting position is effected manually by lifting the pickup.

It will also be possible, however, to effect this releasing action automatically, for instance controlled by the stop mechanism of the phonograph. An embodiment in which such automatic releasing is effected is shown in FIGURE 23. Here the same parts as previously disclosed are referred to by the same reference numerals.

Reference numeral 60 designates a hollow sleeve which forms the pivot axis for the pick-up arm 14. Below the base plate which is not shown in FIGURE 23 the pivot spindle of the pick-up arm is provided with a two-armed lever 62, 64 of which the arm 64 has a downwardly directed projection 66 adapted to engage an arm 68, which is allowed to swing about a spindle 70 in connection with which there is provided a friction link generally designated by reference numeral 72 connecting the arm 68 with another arm 74 the free end 76 of which is capable of being brought into engagement with a nose 78 on the spindle 80 of the phonograph turntable. This mechanism does not need to be described in more detail, because it is known in the art in various embodiments and is generally referred to as an automatic stop mechanism for phonographs. The operation of this mechanism is that when the pick-up approaches the last end of the sound track of the phonograph record, the arm 66 will push the arm 68 and thereby the arm 74 in a direction, which will bring the end 76 of the arm 74 nearer the rotating nose 78. As long as the pitch of the record grooves is unchanged, the nose 78 will be in a position to push the end 76 of the arm 74 away, but when the stylus member passes in the final grooves of the record with increased pitch, the nose 78 will come into engagement with the arm 74 and effect the stop of the mechanism. Hereby another arm 82 will be swung in direction of the arrow B, which again will cooperate with the switch of the phonograph motor (not shown) to stop the mechanism.

When the phonograph is again started this is done by swinging the pick-up outside the periphery of the turntable. This will swing the lever 62, 64 in the direction of the arrow C. An extension 84 of the arm 82 engages an aperture 86 in the arm 68 so that by this movement of the pick-up arm the arm 82 will be readjusted to operate the phonograph motor switch to start the motor.

In order to enable a release of the mechanism, which forms the subject of the present invention, a string or cord 90 is provided secured at 92 to the rear end of the arm 38 extending over a roller 94 at the rear end of the pick-up arm down through the sleeve 60 over a further roller 96 and secured at the other end at 98 to the arm 82. Preferably a spring 100 is interposed in this string or cord.

It will be understood that this mechanism enables an automatic release of the mechanism forming the subject of the present invention from retracted to projecting position either subject to the automatic stop or start of the phonograph.

The wheel or roller 26 is preferably a very easy running wheel of a suitable material, which will not wear the surface of the record during the passage of the wheel thereover. As a suitable material for this wheel or roller the material known under the name "trolitul" can be mentioned. Eventually the edge of the easy running wheel or roller may be covered by some soft material such as rubber or the like in order to further decrease the wear on the surface of the record. It will be understood that it is an important requirement that this wheel is freely rotatable and able to run easily. The rotation of the wheel is effected by means of the rotation of the record and the requirement therefore is only that the wheel must run so easily that it follows the velocity of the record surface.

It will further be understood that in the embodiment shown the passage of the wheel 26 beyond the edge of the record with the following engagement of the friction member 28 on the record surface will result in a movement of the lever carrying said friction member so as to move the whole lever from the projecting position to the retracted position as previously described.

The embodiment shown in the preceding figures can broadly be characterized as an embodiment in which the low friction member and the friction member both are supported on a movable pawl like member, which is adapted to be held in different exterior positions.

It will be appreciated that in this embodiment there will be a certain delay in the release of the mechanism from the projecting to the retracted position. This delay is caused by the time necessary to release the pawl like arm subsequent to engagement of the friction member against the record surface. Though this delay may be only a fraction of a second it is desirable to decrease the delay. It will be understood that if the mechanism is adjusted so as to allow the travel of the pick-up arm in the outward direction when supported by the low friction member with a certain velocity in connection with a record running at 33⅓ r.p.m. the outward velocity of the pick-up arm will be increased when the mechanism is used in connection with a record running at 78 r.p.m. If the delay in release of the mechanism is adjusted in such a manner that the tip of the stylus member is located above the initial groove of a 33⅓ r.p.m. record, there will be the danger that the increased velocity of the pick-up arm across the surface of a 78 r.p.m. record with the same delay of the releasing action will bring the tip of the stylus member outside the sound track portion of the record.

This danger may be avoided by adjusting the travel velocity of the pick-up arm and the delay of the release of the mechanism to match with a 78 r.p.m. record. On the other hand this has the disadvantage that the travel velocity will be increased for a 33⅓ r.p.m. record.

The embodiments shown in FIGURES 24–28 aim to avoid this danger by decreasing the delay in release of the mechanism responsive to engagement of the friction member against a surface of the record.

In this embodiment only the unit is shown. This unit, which in the embodiment illustrated is also adapted to receive the pick-up cartridge comprises a supporting member 102 adapted to be secured in the interior of the pick-up casing. This supporting member is in form of a downwardly open casing having a top wall 104, side walls 106 and 108 and eventually a front wall portion 110 having an aperture 112 for the passage of the pick-up cartridge spindle in the event that a turnover pick-up cartridge is used.

In the side wall 106 there is provided a hole 114 and in the side wall 108 a hole 116. These holes are adapted to receive tiny bearing spindles for the movable part of the mechanism which in FIGURE 24 is shown below the supporting member 102. This movable part comprises a frame having a transverse top portion 118 and side portions 120 and 122 in either of which are provided holes 124 and 126 for the bearing pins. It will readily be understood that the frame member is thereby pivotally arranged in the supporting member.

The front end of the frame member arm 122 is provided with a bifurcated portion 128 in which the wheel or roller 26 is arranged rotatable about a pin 130. In this portion there is further provided a hole 132. Opposite the hole 132 there is in the end of the arm 120 arranged another hole 134.

Between the ends of the arm portions 120 and 122 there is arranged a pivotable member, generally referred to by reference numeral 136. This member has two downwardly extending legs 138 and 140 with sidewardly extending flaps 142 and 144 respectively, adapted to be received in either of the holes 132 and 134. Extending downwardly from the top wall 104 of the supporting member there is arranged a flap generally designated by reference numeral 146 having two shoulders 148 and 150 in different spaced relation from the top wall 104. Further the member 136 is provided with a flap 152 for receiving one end of a spring 154.

The parts here described are so dimensioned that when the structure is assembled, the top edge of the member 136 will engage the member 146 either against the shoulder 150 or the shoulder 148.

In operation the pivotable member is released to the extending position, for instance, by means of corresponding means as described with reference to the preceding embodiment. Hereby as well the roller 26 as the friction member 28 will be moved to the extending position shown in FIGURE 28. The parts will be retained in this position, because the top edge of the member 136 will under influence of the spring 154 be moved to engage the lower shoulder 150.

When the pick-up arrives at the position shown in FIGURE 26 the friction member 28, which is arranged on the lower end of the member 136, will be subjected to a force acting in the direction of the arrow E (FIG. 28). This will swing the member 136 in the direction of the arrow F with the result that the top of the member 136 is released from the lower shoulder 150. The spring 154 will pull the whole pivotable mechanism in the upward direction with the top of the member 136 engaging the upper shoulder 148, which corresponds to retracted position of the parts as shown in FIGURE 27.

Another embodiment in which the pick-up arm is allowed to travel across the surface of a slowly rotating record such as a 33⅓ r.p.m. record with a reasonable high speed and which simultaneously prevents that the tip of the stylus member passes beyond the initial portion of the sound track in case of a faster rotating record such as a 78 r.p.m. record is shown in FIGURES 29 through 36.

In general terms this embodiment prevents the mechanism from being released in a two extreme position by letting the friction member form such an angle with radius that the pick-up arm is moved in the inward direction. It is assured thereby that the release of the mechanism takes place with the low friction member in the position where it engages the edge of the record which is the correct position when the tip of the stylus member should engage the initial portion of the sound track.

Also in this embodiment the mechanism is combined with the pick-up head and surrounds the pick-up cartridge, which is referred to by reference numeral 200. This cartridge is of the turnover type provided with an extending spindle 202 and a handle 204 for turning over the cartridge so as to bring into operative position either a stylus member for playing records of the "normal" type or a stylus member for long playing records.

Also this embodiment comprises a supporting member generally designated by reference numeral 210 (FIGS. 35 and 36) having a top wall 212 and side walls 214 and 216, in either of which there are provided holes 218 and 220 respectively for tiny pivot pins 222 and 224. The supporting member for the low friction member and the friction member is generally designated by reference numeral 226. This member is provided with a top transverse portion 228 and side walls 230 and 232 having holes 234 and 236 for receiving the pivot pins 222 and 224.

The side wall 232 has at its front end a bifurcated portion 238 for supporting the light friction member or wheel 240 which is rotatable on a tiny spindle 242. When the spindle 242 is in position it extends slightly outside the bifurcated portion so as to form receipt for one end of a spring 244.

Also the arm 230 is provided with a bifurcated portion having a top part 246 and side walls 248 and 250. In the side walls there are provided holes 252 and 254 respectively for receiving a small spindle 256 adapted to support the friction member 28, which in this embodiment is in form of a roller 258, having adjacent one end surface a frictional cover 260, for instance, of rubber, and a longitudinal slot 262. In the top wall 246 there is provided an aperture 262 for the passage of a plate formed portion 264 extending downwardly from the front end of the top wall 212 of the supporting member 210. As in the case of the embodiment shown in FIGURES 24 through 28 the top wall 212 is also provided with a downwardly directed extension 266 having a hole 268 which forms bearing for the spindle 202 of the turnover pick-up cartridge. The top end of the sping 244 is at 270 secured to the supporting member 210. When the parts shown in FIGURE 36 are assembled with the different parts shown in the respective positions it will be understood that the lower end of the extension 264, which extends down through the aperture 262 is received in the slot 262 of the friction member 28. The spring 244 will keep the parts in this position which is the retracted position.

In the top wall 212 there is further provided a hole 272 for the passage of a pin 274, the top of which is adapted to be engaged by one end of a pivotable lever 276, which as in the preceding embodiments at its other end is intended for lifting the pick-up from the phonograph record after playing of the same. It will be understood that when placing a finger under this lever and lifting in direction of the arrow H as shown in FIGURE 30, the pin 274 will be pressed down, which will result in moving the front end of the pivotable structure 226 in the downward direction. This will bring the end of the arm 264 out of the slot 262 in the friction roller 258.

This roller is subjected to a bias which will give it a limited rotation in the direction of the arrow K shown in FIGURE 36 as soon as it is achieved from the end of the arm 264. This may be achieved either by means of a spring (not shown) arranged inside the roller and adapted to turn the roller away from the position in which the slot 262 is capable of receiving the end of the arm 264.

In the embodiment shown the force, which turns the roller away from this position is effected by gravity by means of a small weight 278 arranged eccentrically in the roller. The roller may simply be moulded of a suitable plastic material so as to incorporate the small weight 278 in the roller by the moulding operation.

From this explanation it will be understood that when the roller is released it will move a certain angle so as to assume, for instance, the position shown in FIGURE 35. In this position the spring 244, which will still try to move the parts upwardly to the retracted position will cause the end of the arm 264 to step on the cylindrical surface of the roller 258. This will, however, block the movable parts in the operative position shown in FIGURE 34.

In this position the pick-up arm travels as described in connection with the preceding embodiments across the surface of the record to be played in an outward direction due to the fact that the light friction roller 240 forms the angle $v_1$ with the radius.

When the roller 240 passes the edge of the record, the friction roller 260 will retard the movement as previously described. Due to the fact, however, that the friction roller forms the angle $v_2$ with the radius it will during its function effect an inwardly directed movement of the pick-up arm so that in the event that the roller 240 should have passed so far beyond the edge of the record that the stylus of the pick-up cartridge is in a position beyond the initial groove of the record, the pick-up arm will automatically be pulled inwardly to engage the roller 240 against the edge of the record. This inwardly directed pull takes place simultaneously with rotation of the friction roller in the direction of the arrow L shown in FIGURE 35. When this rotation has brought said friction roller to the position where the slot 262 aligns with the arm 264, the spring 244 will pull the mechanism in the upward direction to the retracted position so that the stylus member will be lowered on the record to engage the initial sound track.

In the embodiment of FIGURES 30 to 36 there is indicated in the rear end of the pick-up housing an arrangement, which is shown in greater detail in the perspective view of FIGURE 37. Reference numeral 280 designates in FIG. 37 an insulating plate, which is the rear wall of the pick-up housing from which protrude contact pins 282 and 284 adapted to connect the pick-up with the leads normally extending through the pick-up arm leading to the phonograph amplifier. This arrangement may be made in any other convenient manner. The contact pins 282 and 284 are connected with the output leads from the pick-up cartridge in a manner not shown and are further connected through leads 286 and 288 with contact pins 290 and 292 secured on an insulating bridge 294 arranged in any convenient manner inside the pick-up casing. On the rear end of the movable member 226 there is secured a bifurcated member 296 having arms 298 and 300 adapted to engage a respective one of the contact pins 290 and 292. This member 296 is so constructed and adapted to the movement of the member 226 that the member 296 with its arms 298 and 300 will engage the contact pins 290 and 292 when the parts are in the projecting position so as to thereby shortcircuit the pick-up leads in order to prevent electric noise during the operation of the mechanism, which is the subject matter of this invention. Preferably the short circuiting member 296 is in some way or other electrically insulated from the member 226.

As apparent from the above specification the record indexing device or track finder provides a considerable facility in connection with starting the phonograph inasmuch as it provides a safeguard against scratching of the records and only requires that the operator deposits the tone arm with the track finder mechanism in its projecting operative position on the surface of the record whereafter the rotation thereof will cause the rest including lowering of the stylus with the tip thereof into engagement with the initial sound groove of the record.

As shown in FIGURE 38 a record indexing device or sound track finder, which here may be in the broadest aspect of such a device without the limitation of the embodiments of FIGURE 15–37 may be used in combination with a phonograph mounted or mountable in a cabinet or another article of furniture so as to be movable between an exterior record loading position and an interior playing position.

In FIGURE 38 there is shown an article of furniture in the form of a cabinet-like structure comprising a bottom 410 and top 412 and a back 414. In this structure there is movable arranged a drawer having an intermediate bottom plate 418 and a front plate 420 provided with a handle 422 so as to move the drawer between an exterior position and a closed position. The structure may be an independent unit or a part of a cabinet (not shown) having a built-in radio or another electronic device or amplifier. On the intermediate bottom 418 there is arranged a phonograph, which within the scope of the invention may also be of the automatic record changing type. The phonograph has a turntable 424 which by means of a belt drive or another convenient driving mechanism 426 is driven from an electric motor 428, which by means of a suitable gear mechanism (not shown) preferably can be adjusted to drive the turntable with a preselected of a predetermined number of variable speeds.

The phonograph is provided with a tone arm 430 having a pick-up head 432, the stylus tip of which is adapted to rest in and be guided by the sound groove of the phonograph record during the playing thereof.

The structure shown in FIGURE 38 serves the purpose of facilitating the handling of the phonograph and prevent the stylus from "jumping" on the surface of the record or records, with which the phonograph is loaded, when it is moved to its exterior loading position, and the playing of which takes place when the phonograph is moved to the interior playing position. Between a plurality of possible means for enabling this security the tone arm is in FIGURE 38 provided with an indexing device or track finder in the form of a supporting member 434 movably arranged between an extending or projecting position having a supporting surface below the tip of the stylus member, and a retracted position above the stylus tip and adapted to be released from the projecting position to the retracted position in such an angular position of the tone arm, in which the stylus tip is substantially in alignment with the initial sound groove of the record so as to thereby deposit the tip on the record in engagement with the sound groove thereof.

Simultaneously the starting mechanism of the phonograph is adapted for control so as to prevent rotation of the turntable when the phonograph is in the exterior loading position.

In the simplest embodiment this may be achieved by providing an electric switch for switching on the phonograph motor 428 somewhere on the outside of the cabinet. In such event the operator simply has to load the phonograph with that or the records to be played, deposit the tone arm with the track finder mechanism in its active projecting position on the surface of the record resting on the turntable, close the drawer and then close the switch to start the phonograph motor.

It is advantageous, however, to provide for an automatic start of the phonograph motor in response to the movement of the phonograph to its interior playing position or arrival of the phonograph at or adjacent that position as shown in FIGURE 38. To this purpose an electric cable 436, through which the motor 428 is supplied with current, extends through a switch 438 on the other side of which the cable 440 ends in a plug 442. The switch 438 may for example be of the convenient type having a projecting switch operating member 444, which by means of a spring is normally held in its projecting position, but which is closed when the operating member or pin 444 is pressed inwardly. In the embodiment shown the switch is mounted in such a manner that the member 444 projects so much behind the rear edge of the bottom 418 that the switch operating member is pressed inwardly sufficient enough to close the switch when the drawer assumes its interior playing position.

Though not confined thereto it will be understood that the record indexing device or track finder preferably is in form of a device as described with reference to any of the FIGURES 15 through 37 which are found to ensure the most satisfactory operation.

Though in the foregoing the invention has been described in connection with a so-called single player only, by which the tone arm is capable of playing only one record between each loading of the phonograph with a new record, the invention is also applicable in connection with a phonograph of the record changing type, in which it provides for a simplification of the phonograph allowing the same to play various sizes of records mixed between each other.

An embodiment of a record changing phonograph having an indexing device or track finder as described in connection with FIGURES 15 through 37 is shown in FIGURES 39 through 50.

On a chassis or base plate 510 (FIG. 39) there is rotatably arranged a turntable 512 adapted to be driven by an electric motor (not shown) through a convenient driving arrangement such as a belt drive or the like (not shown). The motor has a control member 514 operable at will to adjust the drive between the motor and the turntable to selectively drive the turntable at a number of different speeds. The turntable is rotatable about a stationary bushing or collar 516 having a bore adapted to receive a spindle 518 extending above the turntable and provided with a shoulder portion 520 for supporting a stack of records in position above the turntable, see FIGURE 43. The spindle is provided with a suitable mechanism to be more fully described in the following and adapted to release upon its activation the lowermost record in the stack by pushing it sidewardly to a position free of the shoulder 520 so as to enable it to slide down along the spindle to the turntable.

For keeping the stack of records resting on the shoulder of the spindle in adequate position, preferably in parallel relationship to the turntable, there is provided a stabilizer member or arm 522 pivotable about a vertical axis and furthermore movable in the vertical direction. The stabilizer arm 522 is adapted to abut the top side of the stack of records as shown in FIGURE 43 so as to keep them in horizontal position.

The stabilizer arm may further be associated as described in the embodiments of FIGURES 1–14 with a mechanism having means to control the start of the phonograph motor in such a manner that the starter switch is not actuated, until the stabilizer arm is moved to or adjacent its position to engage the top side of a stack of records. Preferably there is associated with the stabilizer arm means for operating the motor switch mechanism in response to the approach of the stabilizer arm to said position.

The phonograph is further provided with a tone arm 524 having a pick-up head 525 incorporating a track finder mechanism of any of the constructions described in FIGURES 15–22, 24–28 or 30–36.

It will be appreciated that though the embodiment of the record changing phonograph shown and described with reference to FIGURES 39 through 49 illustrates, by way of example, the record support feeding mechanism incorporated in the centre spindle, the invention is not limited thereto and may instead also employ a reciprocating member having a portion adapted to engage the edge of the lowermost record in the stack and controlled in a similar manner as the reciprocating slide of the embodiment according to FIGURES 1–10 of my copending application U.S. Ser. No. 226,946. Also other modifications of such drop control arrangement may be employed. These are known to those skilled in the art in a plurality of variations and with the indications given herein, it would present no problem to a designer of a record changer of the type to be more fully described in the following to employ such adequate drop control arrangement as would fit into other modifications of the arrangement which are possible within the scope of the invention. It is essential, however, that when using the track finder according to the present invention in a record changing phonograph, some sort of drop control member independent of the tone arm will have to be employed.

The main parts of the phonograph located below the chassis or base plate 510 comprise a cam member 526 (FIG. 40), which through a pivotable arm 528 swinging together with the tone arm is adapted to guide the horizontal movement thereof. The cam member further provides a cam portion adapted to control the movement of a lever 530, see FIGURES 41 and 43, which controls the vertical movement of the tone arm. The cam member 526 is driven by a driving roller 532, which in its turn is driven from a continuously rotating spindle 534, preferably the main spindle of the turntable. Furthermore the mechanism comprises a trip control lever assembly generally designated by reference numeral 536 (FIG. 40) and an operation control lever 538, which is operatively connected with a control member or control members by way of example designated by reference numeral 540, operable at will of the operator. The details of the trip starter control or trigger mechanism including the control lever assembly 536 and its associated parts are disclosed herein only for illustrative purposes but forms no part of the present invention, such trip starter control or trigger mechanism being described and claimed in my copending application Serial No. 79,419, filed December 22, 1960, and entitled "Phonograph Trigger Mechanism."

Though in the following the cam member or disc 526 and the driving roller therefor 532 are shown and described as being parts engaging by friction, it will be understood that it is within the scope of the invention to provide the main driving element 534, the driving roller 532 and the periphery of the cam disc 526 in the form of pinions. Between the centre of the turntable and the centre of the tone arm spindle there is provided a bridge 600', the end of which adjacent the turntable is pressed up bowl-formed at 602 so as to form housing for the bearing of the turntable. The other end of the bridge is secured on a bolt or the like 604. The bridge furthermore forms a support for the rotatably arranged cam disc, which is guided on a pin or spindle extending down through the bridge and secured by a nut or the like 606, see FIGURE 41. In the following the various parts of the mechanism will be described with reference to their functions.

*The operation control and cam driving arrangement*

The driving roller 532 is movable between two positions. In one position, the driving position, the driving roller is interposed between the rotating spindle 534 and the periphery of the cam disc 526. In the other position the driving roller 532 is out of engagement with the driving spindle 534. The driving roller can be moved to the inoperative position disengaging the driving spindle 534 in two different ways. It is either possible forcibly to move the driving roller 532 out of engagement with the driving spindle 534 when it rests against the cylindrical portion of the cam disc or is in engagement with the teeth thereof in the case that the parts are pinions, or it is possible to disengage the driving roller from the driving spindle 534 by allowing it to engage in a recess 542 in the periphery of the cam disc.

The location of this recess is so adapted to the guiding cams or cam tracks of the cam disc that with the position of the parts shown in FIGURE 40 this is the position corresponding to playing of a record enabling a cam track follower 664 on the arm 528 to move freely into a recess of the cam disc through an angle corresponding at least to that angle through which the tone arm is allowed to move during the playing of a record, so that the stylus tip of the tone arm can follow the sound groove of the record without any obstruction from engagement of the cam track follower 664 against stationary parts.

The driving roller 532 is freely rotatable on an arm 544, see FIGURES 40 and 42, being at one end bifurcated at 546 where it is supported in a slot in a bracket 548 below the base plate, see FIGURE 41. At the other end the arm 544 is provided with a key-hole-like aperture 550, which is guided in a recess in a pin 552 secured to and extending below the base plate. Between the end of the arm adjacent the key-holed aperture and a suitable stationary point there is interposed a spring 554 serving to pull the arm 544 in the direction of the arrow shown adjacent said spring.

As most clearly shown in FIGURE 42, the driving roller 532 is arranged offset to the centre line between turntable spindle and the centre of the cam disc so that the spring 554 will serve to press the driving roller into engagement with the surface of the cam disc and hence also into the recess 542 when the latter is opposite the driving roller 544. The tension of the spring 554 and the mutual location of the parts is so that when the driving roller enters the recess 542 it will remain therein, and the recess is deep enough to bring the driving roller out of engagement with the rotating spindle 534.

When an initial movement by means of the trip control mechanism to be described more fully in the following is given to the cam disc, the driving roller 532 will be brought up along the cylindrical portion of the cam disc and reassume its driving engagement with the spindle 534, whereafter the cam disc will rotate a full revolution, until stopped again by the roller 532 entering into the recess 542, if not otherwise stopped in a manner to be described in the following. The arm 544 furthermore has an upwardly extending flap 556 forming an abutment for one end of the control arm 538. This arm serves as a displacing member for the arm 544 to provide for disengagement of the driving position of the roller 532 in another manner than bringing it into the recess 542. The control arm 532 is in form of an elongated member having one end guided in the bracket 548 as shown in FIGURE 41 and being guided at the other end in a recess 558 in a depending stationary member or bushing 560*a* (FIG. 50) forming a part of a bushing 560 in which the stabilizer arm spindle is guided. This bushing is as most clearly shown in FIGURE 50 provided with said recess only at one side, while the opposite side is a part of the material removed so as to allow a tilting of the arm 536 to the position shown in dotted lines in FIGURE 50.

The bushing 560 has a cylindrical bore for the spindle 562 of the stablizer arm 522. In said bore there is opposite the recess 558 a longitudinal slot, in which a longitudinal member or rod 564 is arranged. Said rod 564 has as its lower end a shoulder or the like 566 so that the rod is loosely resting on the top of the arm 538 and will tilt the same to the position shown in dotted lines in FIGURE 50, when the rod 564 is pushed downwardly which as will be described in the following takes place by the weight of the stabilizer arm 522 after playing of the last record in the magazine.

The normal operating position of the operating arm 538 is a substantially horizontal position. To keep the arm in that position there is between the arm 538 and the base plate interposed a suitably dimensioned momentum spring 574, one end of which fits into a hole 570 in the arm 538, and the other end of which fits into a hole 572 in the base plate, see FIGURE 42.

The dimensions of this spring and the location of the ends thereof are so adapted to the movement of the control arm 538 that displacement of this arm in direction of the arrow shown adjacent the right end thereof will bring the spring 574 to pass its switch-over-point substantially just before the left hand end of the arm 538 comes into engagement with the flap 556. Furthermore the movement of the arm 538 and the dimensions of the spring 574 is large enough to ensure that the arm 538 will be moved so much beyond the switch-over-point of the spring that it will move the driving roller carrying arm 544 a distance which is sufficient enough to bring the driving roller out of engagement with the rotating spindle 534 when the driving roller rests against the cylindrical portion of the cam disc.

The operating arm 538 is in a similar manner as described with reference to the embodiment of FIGURES 1–14 adapted to operate an arm 578 for a switch 580 in the circuit of the phonograph motor. The arm 578 extends across a part of the edge of the arm 538 between two abutments 576 and 577, which are located in such a manner that in the position shown in FIGURE 40 the abutment 576 has moved the switch arm 578 to close the switch while with the movement of the arm 538 to the position disengaging the driving roller the abutment 577 will move the switch arm 578 to open the switch.

The longitudinal displacement of the operation arm 538 may either as described in the embodiment of FIGURES 1–14 be effected in the starting position, viz. the position shown in FIGURE 40, under influence of an abutment associated with the spindle on the stabilizer arm or as shown in the present embodiment by means of the member 540 enabling movement of the arm under control at will. In the embodiment shown in FIGURES 39, 40 and 44 the manual control member is in form of a pivotable lever 588, the lower end of which is movable in a slot 590 in the arm 538. From FIGURES 40 and 44 it will readily be understood that by swinging this lever to the position shown in FIGURE 44, the lower end of the arm 588 will abut against the right hand end of the slot 590 and thereby push the operating arm 538 to the position corresponding to closing of the switch and releasing the diriving roller to assume its driving position under influence of the spring 554.

Movement of the control arm in the opposite direction corresponding to switching off the motor and the drive is effected by means of an abutment 592 on the cam disc cooperating with an abutment 539 on the control arm 538. It may be possible, as described in the copending U.S. patent application Ser. No. 226,946, to have associated with the stablizer arm 522 an abutment operable to engage the control arm 538 to move the same in the direction of the arrow to stop the mechanism when the stablizer arm is lifted and swung outwardly. Under certain circumstances, however, such manual operation of the control arm is not convenient, because it involves the risk that the phonograph may be stopped during the cycle of movement where some of the parts are locked together, for example with the cam track follower 664 locked in a cam track.

It has therefore been found convenient to provide for an operation of the control arm to its stop position by means of the control mechanism alone, which is achieved by the afore-mentioned tilting movement of the control arm 538, which will bring the abutment 539 thereon into the path of the abutment 592 on the cam disc. This tilting has a double purpose and it can be achieved in two different ways.

When the rotation of the cam disc is initiated after playing of the last record, the stabilizer arm 522 has been allowed to slide downwardly and has pressed the rod 564 downwardly to tilt the control arm 538, see FIGURE 50. Hereby the abutment 592 on the cam disc comes into engagement with the abutment 539 when the cam disc has rotated a relatively small angle, and this engagement will result in a forcible longitudinal displacement of the control arm 538 in the direction of the arrow shown, which will open the switch 580 and disengage the roller 532 from its driving position.

The same tilting can be accomplished by means of a nose 589 on the lower end of the control arm 588. The control arm 538 further has a pawl-like member 594 or the like, for example in form of a leaf spring, which is relatively weak and which in the normal position of rest of the cam disc during the playing of a record lies in a recess or the like 596 in the top surface of the cam disc. This recess is provided with an inclined portion and a relatively steep portion perpendicular to the end of the pawl member 594.

By tilting the control lever 588 to the position designated by II in FIGURE 40, the control lever will give the control arm 538 a limited movement in the direction of the arrow shown, not sufficient to bring the momentum spring 574 over its switch-over-point but sufficient to abut the end of the pawl member 594 against the steep abutment side of the recess 596 to thereby impart to the cam disc an initial movement bringing the driving roller 532 out of the recess 542. If the control member is not further operated, this will only start the sequence of operations which means that the control hereby serves as a rejecting control for initiating the change in the event for example that the playing of an undesired record has been started.

If, however, the control lever 588 is actuated further to the position shown by III, the nose 582 will come into engagement with the underside of the control arm 438 and tilt it in exactly the same manner as described hereinabove with the result that the abutment 592 will engage the abutment 539 to stop the mechanism in the manner already described, provided that the control lever 588 is kept for a short moment in the position corresponding to III.

It will be appreciated that the control arm 538 in the embodiment here described has a plurality of functions, namely Closing the motor switch
Opening the motor switch
Releasing the drive roller to its driving position
Disengaging the driving roller from its driving position
Giving the cam disc an initial movement to reject a record
Stopping the phonograph after playing of the last record, and
Stopping the phonograph under manual control at any time It will be understood that instead of performing the manual control arrangement in the form of a pivotable lever as shown, a push-button system may also be employed as shown in FIGURE 45.

In this embodiment there are provided three push-buttons 750, 752 and 754 corresponding to start, stop and reject. Either of these three push-buttons is arranged on top of a push-button arm or spindle 756, 758 and 760 respectively, the top ends of which are guided in holes or apertures in the base plate 510 and the lower ends of which are guided in holes in a lower base plate 762 for the push-button system. This base is supported below the chassis 510 in spaced relationship thereto by means of convenient supporting means 764 and 766, preferably in the form of plate formed members having oppositely arranged holes for guiding a displaceable locking plate 768, which is movable against the action of a spring 770 and in its one end position is limited with respect to its movement by means of an abutment 772.

In FIGURE 45 the control arm 538 is shown in its right hand position corresponding to its playing position. The control rod has been moved to this position by the depression of the starter push button which is provided with a cam portion 780 projecting sufficiently sidewardly in the longitudinal direction of the control arm 538 to press the arm to its right hand end position by entering into an aperture 782 in the arm.

As well the stop push-button 752 and the reject push-button 754 are provided with oppositely extending cam portions 784 and 786 respectively. The cam 784 is adapted to cooperate with the opposite end of the slot 782 and the cam 786 is adapted to cooperate with the left hand end of a further slot 788 in the control arm 538. The height of the two cam members 784 and 786 is less than the height of the cam 780 so as to only allow a left hand movement of the control arm 538 to such a degree as to start the cam disc. Either of the three push buttons are spring loaded by means of springs 790, 792 and 794. The reject push-button, which only serves the purpose of rejecting a record has no other projections than the cam 786.

The stop push-button is provided, in addition to cam 784 with a sidewardly extending arm 796, see FIGURE 45*a*, having a depending end portion 798 adapted to engage the rear edge of the control arm 538 to tilt it in the same manner as when the abutment 566 is loaded by the weight of the stabilizer arm 522. In order to lock the push-button 752 in its depressed position tilting the control arm 538 to the position shown in dotted lines in FIGURE 45*a*, a pawl 753 is provided on the push-button adapted to snap behind the edge of an aperture in the movable locking member 768, which during the depression of the stop push-button is pushed towards the right until the spring 770 causes it to snap over the pawl 753. This means that when pressing the stop push-button it remains in the stop position.

To release the stop push-button there is on the start push-button provided a cam member 751 adapted to move the locking member 768 to relieve the pawl 753 by the depression of the start push-buttton. The cam 751 is so dimensioned that it is not allowed to snap under the locking member 768 but serves only that purpose of relieving the pawl 753 and thereby the stop push-button.

In this embodiment it is also possible to secure the phonograph against being started without the stabilizer arm 522 in its position of rest against the top of the stack of records. To this purpose the lower end of the spindle 562 of the arm is provided with an abutment in the form of a disc or the like 532, which is kept in such a horizontal level, until the stabilizer arm has been swung inwardly that it will form a stop for depressing of the starter push button 750, until the stabilizer arm has been swung inwardly and allowed to move down into engagement with the stock of records in which position the disc 532 assumes the position shown in dotted lines in FIGURE 45, in which it will no longer prevent the depression of the starter push-button.

The manner in which the disc or abutment 532 can be brought to assume this blocking position can be performed in various ways, for example in the manner described with reference to FIGURES 3 and 4 in my copending American patent application Ser. No. 226,946, "Trip Starter."

As mentioned hereinabove the trip starter, which forms no part of the present invention and the details of which are also fully disclosed and claimed in my copending application Serial No. 79,419, filed December 29, 1960, and entitled "Phonograph Trigger Mechanism," comprises an arm generally designated in FIG. 40 by reference numeral 536. This arm is actually in the form of two arms, which are mutually arranged and cooperating in a manner to be described in the following.

Adjacent the base plate and pivotable about a pin 600, see also FIGURE 48, one of said arms is arranged. The end of that arm remote from the centre of the turntable is designated by reference numeral 602, and the other end by 604. In the base 510 there is provided a pair of ribs or the like 606 and 608 so as to support the arm 602, 604. These ribs are arranged at a certain distance from the pin 600, preferably an equal distance from either side thereof. The lower arm is designated by 610 and is supported on the pin 600 by means of a key-hole-like aperture 612, the narrow portion of which fits round a recess in the pin 600. Between this pin 600 and the arm 610 there is interposed a spring 614 serving to keep the two arms 602, 604 and 610 in such a mutual relative position, in which the arm 610 projects as much as possible with the narrow end of the keyhole abutting against the pin 600 allowing a relative longitudinal movement of the two arms.

The arm 602 has a downwardly extending flap 603 which also has a certain inclination relatively to the longitudinal direction of the arm 602, 604. Furthermore the flap 603 has a slot 605 for the passage of a projection on the rear end of the arm 610, said projection terminating with another downwardly extending flap 611. The contact between the two arms 602, 604 and 610 is provided nearer the centre of the pin 600 than the ribs 606 and 608 and is provided by a pair of ribs 616 and 618 on the arm 610. From this it will be understood that the friction between the parts is so that there is less friction between the two arms than between the upper arm 602, 604 and the base. In other words, this means that if the arm 610 is subjected to an action, which will cause it to swing on the pin 600, it will be able to swing without imparting the movement to the arm 602, 604. Oppositely, the difference in friction at the two points will inevitably cause that if the arm 602, 604 is subjected to a movement by which it will swing on the pin 600, the movement will be transmitted to the lower arm 610, so that the latter will follow the upper arm. On the cam disc 526 there is arranged an abutment 620, which, when the cam disc is in the playing position, will be located immediately behind the flap 611 on the arm 610 so that a movement of that arm, when its extending end comes into engagement with a nose or abutment 622 on the rotating spindle 534 will cause transmitting of an initial movement to the cam disc so that the driving mechanism thereof will be started in the manner previously described.

The lever system acts as a trip starter by the engagement of an abutment 607 against an abutment surface 624 on the cam track follower 528.

The cooperation between these two abutments 607 and 624 is caused to take place at a relatively late time during the playing of a record, because the abutment knob 620 on the cam disc is utilized to adjust the initial position of the trip starter lever mechanism during the rotation of the cam disc. When the trip starter lever 610 and its front end is engaged by the nose 622 and thereby pushed in direction of the arrow shown adjacent that lever in FIGURE 40, the movement of the lever is transmitted via the abutment 611 to the abutment 620 on the cam disc so as to impart an initial movement thereto. Hereby the cam disc starts to rotate and when it has rotated nearly a whole revolution, the abutment member 620 comes into engagement with the inclined flap 603, which will cause swinging the whole trip starter lever clockwise. During this movement the lower part of the lever 610 will also be adjusted relatively to the top part of the lever 602, 604, thereby that the exterior edge of the lever 610 comes into engagement with the stationary abutment 626 depending for example below the chassis plate. This abutment is resilient for example in form of a small pin having a rubber sleeve so that after the passage of the abutment 620 on the cam disc over the rear edge of the flaps 603 and 611 the portion 610 will be allowed to swing back sufficient enough to bring the flap 611 opposite the abutment pin 620 the one side of which adjacent the edge of the flap 611 is flattened as shown in FIGURE 40 so as to secure a safe push action, when the lever 610 is moved longitudinally. The mutual movement of the two trip starter lever portions is limited by means of abutments 613, 615 in the form of flaps extending downwardly at either side edge of the upper lever portion at the left hand end thereof. The purpose of this limited movement is to ensure that the two trip starter lever portions do not move relatively more than necessary for their function.

As seen in FIGURES 40 and 49 the front end of the trip starter lever arm 610 has a flap 630 extending perpendicularly to the plane of the lever arm 610 so as to provide a front edge of a sufficient area to receive the pressure between the abutment surface of the rotating nose 622 and the lever arm 610. By increasing the surface, which in prior constructions of trip starter mechanisms has been very small, it is made possible for the rotating nose 622 to avoid use of steel or other hard material, which may give rise to noise during the operation, when the nose during either of its revolutions pushes the lever slightly back as long as the stylus tip of the phonograph passes in that part of the sound groove of the record, which has a normal pitch. By means of the construction shown it is possible for the nose to use for example a material of the kind, which is known in the trade as nylon, and which will not cause such noise.

*Cam disc*

As shown in FIGURE 40 and as more clearly shown in FIGURE 46, the cam disc is provided with an arcuate recess 646, which is so located that it has its centre substantially in the centre of the tone arm spindle in that position of the cam disc, in which it is kept during rest by the driving roller 532 engaging the recess 542. The arcuate recess 646 is deep enough to allow free passage of the cam track follower 664 on the pivotable arm 528 rigidly connected with the tone arm 524. The tone arm is as shown in FIGURE 43 supported on a sleeve or bushing 648, through which extends an elongated member 649 for example in form of a thin spindle. This member 649 serves to raise the tone arm from the record. The lower end of the sleeve 648 is slotted at **648*a* as shown in FIGURE 40 and fits into a correspondingly formed hole 650 in the arm 528. Furthermore the lower end of the bushing 648 is screw-threaded and secured by means of a nut (not shown) under the arm 528 so as to secure a rigid connection between the arm 528** and the tone arm.

In the embodiment shown the cam track follower 664 is in form of a pin, substantially perpendicular to the plane of the cam disc. This pin is displaceable against the action of a leaf spring 666, which will serve to press the lower end of the pin into engagement with cam track of the cam disc.

The arcuate recess 646 is connected with a recess 668, the bottom of which preferably is at a slightly higher level than the bottom of the recess 646 so as to engage and eventually press the lower end of the cam track follower slightly upwardly if and when the tone arm is swung to a position, where the cam track follower enters the recess 668. An inclined surface 670 connects to recess 646 with the recess 668. Along the periphery of the recess 668 there is provided a cam track 672, the bottom of which is in a slightly lower level than the bottom of the recess 668, but preferably not low enough to relieve the lower end of the cam track follower. The cam track 672 extends into a cam track **672*a*, which communicates with an extension 646*a* of the recess 646, said extension 646*a* being substantially concentric with the cam disc. The point of intersection of the cam track portion 646*a* and 672*a* corresponds to an angle position of the tone arm nearest to the centre of the turntable. From this point there extends a cam track portion 674 terminating near the periphery of the cam disc. It will thus be understood that the end of the track portion 674 corresponds to an angular position of the tone arm in its most exterior position. From here there extends an exterior cam track portion 676 substantially concentric with the cam disc so as to keep the tone arm in its exterior position for a while. Finally an inwardly extending cam track portion 676*a* leads back to the recess 646, in which it is branched at a point corresponding to an angular position of the tone arm inside the periphery of a record of the smallest size to be played. The last portion 676*b* of the track 676*a*** is slightly broader than the remaining parts of the tracks so as to allow a limited sideward play of the cam track follower during the passage in the section 676b.

Preferably the bottom of the cam tracks is V-formed and on a level pressing the cam track follower 664 slightly upward so as to secure a safe guiding.

On the pivotable lever 530, see FIGURES 41 and 43, there is at one end arranged a small roller or the like 708, adapted to engage a cam portion 710 below the cam disc, said cam portion controlling the vertical movement of the tone arm. The other end of the lever 530 has a hole through which the member 649 passes. On the lower end of the member 649 there is provided a small nut or the like 712 adjusted so as to lift the tone arm. The cam portion 510 is provided with a plurality of sections which in FIGURE 46 and in the diagram, FIG. 47 have the same numbers as the sections in the top surface of the cam disc.

Furthermore there is provided on the bridge 600' another pivotable lever 720 having at one end a small roller or the like 722 cooperating with a further cam portion 724 below the cam disc. The other end of the lever 720 is cooperating with a rod 726 arranged for longitudinal displacement inside a bore of the spindle 518.

The construction of this spindle is by way of example the following.

The top of the spindle above the shoulder 520 is eccentric relatively to the body portion of the spindle and terminates at 520a so much above the shoulder 520 which corresponds to a vertical distance between the two parts that one record can pass below the surface 520a, while two records cannot do so. In a slotted portion of the spindle a small pivotable lever 521a is arranged, extending with its top end above the shoulder and having at its lower end an inclined surface 521b. It will easily be understood from FIGURE 43 that when pushing the interior rod 726 upwardly this will cause the small lever 521a to swing anti-clockwise and thereby impart a sideward movement to the lowermost record in the stack so as to feed it down on the turntable.

This brief construction of the spindle is only considered as an example as to how a spindle for a phonograph according to this invention may be designed, but for those skilled in the art there will be a plurality of variations available which will be just as well applicable within the scope of my invention.

As already mentioned there is provided in the pickup head 525 a phonograph indexing device according to any of the embodiments described hereabove with reference to FIGURES 15 through 37. This indexing device or track finder arrangement is provided with an actuating member 730 corresponding to the member 30 in any of the embodiments described and adapted to release the supporting members of the track finder from their retracted to their projecting position.

In the record changing phonograph described this release is adapted to take place by the engagement of the actuating member 730 against the stationary member 732, which in the embodiment shown is an inclined surface 734 on the top of a post 736 (FIG. 39).

Figure 42A:
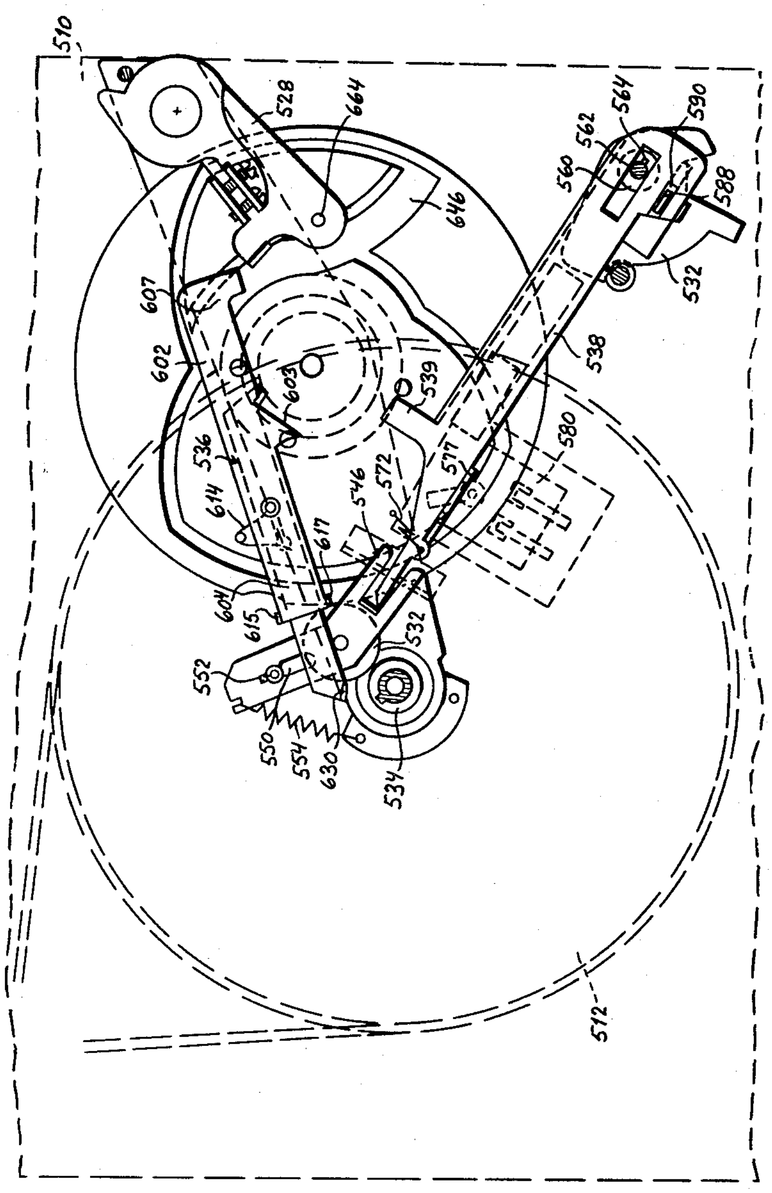

The operation of the phonograph is as follows:

The position of rest of the cam disc is the position shown in FIGURE 42a in which the abutment 592 on the cam disc has pushed the control arm 538 to its left hand exterior position, in which the abutment 577 has caused the switch operating member 578 to open the switch, and in which the left hand end of the arm 538 has pushed the driving roller 532 out of engagement with the spindle 534. This position is so adapted that it is not very far from the position of rest shown in FIGURES 40 and 42. The rotation from this position of rest (playing position) to the stop position is sufficient, however, to cause the tone arm to be raised, see section 1 of the diagram in FIGURE 47. Due to the recess 668 of the cam disc, the tone arm is, in this position of rest, still freely movable through its entire angle so that there is no danger of any parts being damaged, if for example a child tries to move the tone arm. In this position the phonograph is loaded with a stack of records in the magazine resting on the shoulder 520 of the spindle 518. The stabilizer arm is brought to its engaging position and the phonograph is started, either by pressing the starter push button in the embodiment of FIGURE 45, or tilting the control lever 588 to the position I, shown in FIGURE 40. Then the cam disc starts to rotate. When the cam track follower 664, either through the cam portion 646a or the cam portion 672a, depending on in which angular position the tone arm has been left, enters the cam track 674, the tone arm is moved outwardly, see section 3 of the diagram in FIGURE 47. When the tone arm arrives at its exterior position, the actuating member 730 of the track finder mechanism comes into engagement with the abutment 734 and releases the cam track members to their projecting position. The tone arm then remains lifted in its exterior position through the entire section numbered 4 of the diagram, FIGURE 47. At the point IIa the cam member 724 causes the lever 720 to be tilted to operate the feeder mechanism in the spindle so as to feed a record down on the turntable.

When the cam track follower 664 enters the cam section 676a the tone arm is moved inwardly, see section 5 of the diagram. At the point IIIa the tone arm is in an angular position inside the periphery of the smallest record to be played. During the section 5 in the diagram the tone arm has also been lowered and just after the final interior angular position of the tone arm has been reached, the tone arm is lowered into engagement with the record. Hereby the tone arm rests on the supporting member 26 of the track finder mechanism and will as explained in detail in connection with the same by means of the rotation of the record be carried out to the edge thereof, where the track finder mechanism will be released and the stylus tip brought into engagement with the initial groove of the record. The movement of the tone arm in the outward direction is allowed, irrespective of the size of record, because the cam track follower is free to move in the recess 646 of the cam disc.

During this movement and during the playing, the cam disc is stopped in the position shown in FIGURE 40 with the driving roller 532 in the recess 542.

If the record is to be rejected an initial movement is given to the cam disc by pushing the control arm 538 either by means of the rejector push-button in the embodiment of FIGURE 45 or by bringing the operation lever 588 into the position designated by II in FIGURE 40.

If the record has been allowed to play the whole way through, the abutment 624 on the arm 528 will during the last part of the playing engage the abutment 607 on the trip starter lever mechanism. Initially the free end of the trip starter lever 610 will be rejected by the rotating nose 622 but when the stylus tip passes into the end groove of the record having a larger pitch the increased velocity of the tone arm will cause an increased velocity of the swinging of the trip starter lever so as to allow the rotating nose 622 to push the lever 610 so as to thereby impart an initial movement to the cam disc through the abutment 620.

If it is intended to stop the mechanism during playing of a series of records, it is possible, either in the embodiment of FIGURE 45 to press the stop push button to tilt the control arm 538, or in the embodiment of FIGURE 40 the same is achieved by tilting the control lever 588 into the position designated by III. This brings the abutment 539 in the path of the abutment 592 on the cam disc, which simultaneously with the operation of the manual control has been caused to start, because the tilting of the control arm 538 is combined with a slight longitudinal movement, sufficient enough to start the movement of the cam disc. The same stop action takes place in connection with the automatic stop after playing of the last record when the weight of the stabilizer arm presses the rod 564 downwardly to tilt the control arm 538.

It will be understood that the invention is not limited to the embodiments shown and described with reference to the drawings, but that modifications in various respects will be possible within the scope of the invention.

Thus for example it will be understood that the adjustment of the trip starter mechanism to assume an initial position, in which it is not operated by the movement of the tone arm until the latter approaches the last part of the sound groove of the record may also be applied to single players within the scope of the invention.

In a phonograph as described comprising a track finder mechanism it is of course essential that such adjustment of the position of the trip starter is effected. If a trip starter is controlled by means of the angle of the tone arm, it is necessary to assure that the angular position of the tone arm, in which the track finder is deposited on the surface of the record, is outside the angular position in which the trip starter is operated, because otherwise the trip starter would be operated to initiate a further cycle of movements.

If the trip starter is controlled by the velocity of the tone arm, i.e. by the passage of the stylus tip in the outlet soundgroove of the record, this drawback will not be dominating, but it is still desirable to adjust the trip starter so as not to involve any risk of operating the same until the tone arm is moved inwardly a further angle from that angular position, in which it is deposited on the record surface.

In single players the actuating mechanism is not a trip starter, but a stop control adapted to actuate the switch of the phonograph motor to open the same in order to stop the motor after playing of either record. This switch control mechanism is operated by an abutment on the lower end of the tone arm spindle in the same manner as the trip starter in a record changing phonograph. It will also be possible to utilize the adjustment of the stop control mechanism in a single player in a similar manner as here outlined in connection with a record changing phonograph. In this event there may instead of the abutment on the rotating cam disc be provided an abutment associated with the tone arm spindle and adapted to engage the stop control mechanism which is equivalent with the trip starter of a record changing phonograph. Thus for example it is normal practice before start of a single playing phonograph to move the tone arm in the outward direction to open the switch. This movement may be utilized to bring an abutment, for example, on the switch control lever or any other convenient location to engage the stop control to adjust its position in the same manner as here described with reference to the record changing phonograph, i.e. to such a position that the tone arm has a relatively large angle and can be moved relatively near the centre of the record before actuating the stop control mechanism. This is especially of importance when playing small records of 7 inch diameter, because when playing such records it is necessary, when utilizing a track finder to approach the tone arm rather near to the centre of the record to deposit the track finder on the surface thereof.

I claim:

1. A trackfinder mechanism for use in an automatic phonograph having a tone arm provided with a stylus member and operative to support the stylus tip in spaced relationship to the surface of a rotating record and to cause the stylus tip to engage the sound track of a record in the start-of-play position, comprising first means, second means, support means for supporting said first and said second means on said trackfinder mechanism including latch means to selectively provide for said first and second means an operative projecting position in which said first means is operative to engage the record surface with said second means and said stylus tip spaced from the record surface and in which said second means engages the record surface after said first means passes beyond the edge of the record to keep said stylus tip spaced from the record surface and an inoperative retracted position in which said first and second means are effectively disposed above said stylus tip with said stylus tip operative to engage the sound track, said latch means including means for retaining said first and second means in said operative projecting position, release means for said retaining means to enable said first and second means to assume said inoperative retracted position, and means operatively connecting said second means with said release means for actuating said release means in response to engagement between said second means and the record surface.

2. A trackfinder mechanism according to claim 1, wherein said second means is in a plane between said first means and said stylus tip and nearer the center of the record than said first means.

3. A trackfinder mechanism according to claim 1, further comprising means for rendering said support means tiltable essentially perpendicularly to the plane of the record.

4. A trackfinder mechanism according to claim 1, further comprising spring means biasing said support means to keep said first and second means in said inoperative retracted position thereof above the stylus tip.

5. A trackfinder mechanism for use in an automatic phonograph having a tone arm provided with a stylus member and operative to support the stylus tip in spaced relationship to the surface of a rotating record and to cause the stylus tip to engage the sound track of a record in the start-of-play position, comprising first means, second means, the tone arm together with the trackfinder mechanism moving outwardly during engagement of said first means with the surface of the record and said second means being operative upon contact thereof with the surface of the record to move said tone arm inwardly, support means for supporting said first and said second means on said trackfinder mechanism including latch means to selectively provide for said first and second means an operative projecting position in which said first means is operative to engage the record surface with said second means and said stylus tip spaced from the record surface and in which said second means engages the record surface after said first means passes beyond the edge of the record to keep said stylus tip spaced from the record surface and an inoperative retracted position in which said first and second means are effectively disposed above said stylus tip with said stylus tip operative to engage the sound track, said latch means including means for retaining said first and second means in said operative projecting position, release means for said retaining means to enable said first and second means to assume said inoperative retracted position, and means operative during engagement between said second means and the record surface for actuating said release means to thereby establish said inoperative retracted position for said first and second means.

6. A trackfinder mechanism according to claim 1, wherein said second means is operative upon engagement with the record surface to move said tone arm inwardly, and means for effectively limiting said inward movement of the tone arm.

7. A trackfinder mechanism according to claim 1, wherein said last-mentioned means extends longitudinally of said tone arm.

8. A trackfinder mechanism according to claim 1, further comprising a member on said phonograph for actuating thereby said last-mentioned means.

9. A trackfinder mechanism according to claim 1, further comprising manually operable means for actuating said latch means to bring said first and second means into the operative projection position thereof.

10. In a record changing phonograph having a trackfinder mechanism operative to support the stylus tip of a phonograph in spaced relationship to the surface of a rotating record and to cause the stylus tip to engage the sound track of a record in the start-of-play position, the combination with the tone arm of a trackfinder mechanism comprising a first member adapted to support the tone arm with the stylus tip spaced from the surface of the record, a second member arranged in trailing relationship to said first member, means operable to move the tone arm outwardly toward the edge of the record upon engagement of said first member with the surface of the record to be played to a position thereof beyond the edge of the record, support means for supporting said first and second member on said trackfinder mechanism including latch means for latching said first and second members in an operative projecting position in which said first member is operative to engage the record surface with said second member and said stylus tip spaced from the record surface and in which said second member engages the record surface after said first member passes beyond the edge of the record to keep said stylus tip spaced from the record surface, unlatching means for unlatching said first and second members into an inoperative retracted position in which said first and second members are effectively disposed above said stylus tip with said stylus tip operative to engage the sound track, and control means operatively connecting said second member with said unlatching means for automatically actuating said unlatching means and thereby shifting said first and second member from the said operative position thereof to the said inoperative position thereof in response to engagement between said second member and the record surface.

11. In a record changing phonograph, the combination according to claim 10, wherein engagement between said second member and the record surface produces a frictional restraint, and means operative in the presence of said frictional restraint for rendering said first-mentioned means inoperative to control the further movement of the tone arm.

12. In a record changing phonograph, the combination according to claim 10, further comprising spring means operative to move said first and second members to the said inoperative retracted position thereof upon actuation of said unlatching means.

13. In a record changing phonograph, the combination according to claim 10, further comprising a reciprocable actuating member operatively engaging said support means, and means for reciprocating said actuating member to move said support means into the latching position thereof in which said first and second members are in the operative projecting position thereof.

14. In a record changing phonograph, the combination according to claim 13, wherein said trackfinder mechanism is included in the tone arm structure, and wherein said actuating member extends above the top of said tone arm structure.

15. In a record changing phonograph, the combination according to claim 13, further comprising cycle control means for moving the tone arm in a predetermined cycle between each playing of a record, and wherein said means for reciprocating said actuating member is constituted by a relatively stationary member adapted to be engaged during the cycling movement of said tone arm.

16. A trackfinder mechanism for use in a phonograph having a tone arm and operative to support the stylus tip arranged at said tone arm in spaced relationship to the surface of a rotating record and to cause the stylus tip to engage the sound track of a record in the start-of-play position, comprising first means operative to effect travel of said tone arm across the surface of the record in the direction toward the edge thereof, second means operatively connected with said first means to follow the travel path thereof in spaced relationship from the surface of the record while said first means engages the record surface, support means for supporting said first and second means on said trackfinder mechanism including latch means to selectively provide for said first and second means an operative projecting position in which said first means is operative to engage the record surface with said second means and said stylus tip spaced from the record surface and in which said second means engages the record surface after said first means passes beyond the edge of the record to keep said stylus tip spaced from the record surface and an inoperative retracted position in which said first and second means are effectively disposed above said stylus tip operative to engage the sound track, said latch means having means effectively establishing said operative projecting position for said first and second means, and means controlled by the engagement of said second means and the surface of the record for operating said means effectively establishing said projection to thereby shift said first and second means from the said operative projecting position thereof to the said inoperative position thereof.

17. A trackfinder mechanism according to claim 16, wherein said first means includes means for moving the tone arm across the surface of the rotating record in the outward direction toward the edge of the record upon engagement of said first means with the surface of the rotating record, said second means being movable together with said first means, and actuating means for moving both said first and second means from the inoperative, retracted position to the operative projecting position thereof.

18. A trackfinder mechanism according to claim 16, wherein said first means includes means for moving the tone arm across the surface of a record in response to rotation thereof in the direction toward the record edge, said second means including means operative to move the tone arm across the surface of the record in the inward direction from the edge in response to rotation of the record, said first means forming an abutment to stop movement of said tone arm in the inward direction as caused by said second means, and means operable to move said first and second means to the said operative projecting position thereof.

19. A trackfinder mechanism according to claim 16, wherein said first means is a roller member and wherein said second means is a trailer member, said roller member forming such an angle with the radius through the point of engagement thereof with the surface of the record that the rotation of the record causes the roller member to rotate and to carry the tone arm in the outward direction beyond the edge of the record as a result of said rotation, said trailer member being operative to engage the surface of the record with a predetermined friction under the influence of the weight of the tone arm, the speed of travel caused by said roller member and by said friction being so related and matched to each other that when said trailer member is brought into engagement with the record surface, the friction will effectively aid in stopping the outward travel of the tone arm with the stylus tip essentially in alignment with the initial sound groove of the record.

20. A trackfinder mechanism operative to support the stylus tip of a phonograph in spaced relationship to the surface of a rotating record and to cause the stylus tip to engage the sound track of a record in the start-of-play position, comprising first means, second means, support means for supporting said first and said second means on said trackfinder mechanism including latch means to selectively provide for said first and second means an operative projecting position in which said first means is operative to engage the record surface with said second means and said stylus tip spaced from the record surface and in which said second means engages the record surface after said first means passes beyond the edge of the record to keep said stylus tip spaced from the record surface and an inoperative retracted position in which said first and second means are effectively disposed above said stylus tip with said stylus tip operative to engage the sound track, and means operatively connecting said second means with said latch means for shifting said first and second means from the said operative position thereof to the said inoperative position thereof in response to engagement between said second means and the record surface.

21. A trackfinder mechanism according to claim 20, wherein said support means is a pivotal member.

22. A trackfinder mechanism according to claim 20, wherein said first means is operative to move the tone arm outwardly in the direction toward the edge of the record upon engagement thereof with the rotating record surface, and wherein said second means is operative to move the tone arm in the inward direction upon engagement thereof with the surface of the rotating record.

23. A trackfinder mechanism according to claim 20, further comprising means for delaying a predetermined time the shifting of said first and second means from the said operative position to the said inoperative position thereof in response to engagement between said second means and the record surface.

24. A trackfinder mechanism according to claim 20, wherein said latch means includes retaining means for retaining said first and second means in the said operative projecting position thereof, and further comprising means operative upon engagement of said second means with the rotating record surface to correct for the passage of said first means too far beyond the record edge by swinging the tone arm inwardly again, and wherein said means operatively connecting said second means with said latch means is operative to release said retaining means upon completion of the correction by said last-named means.

25. In a phonograph having means for moving the tone arm through a path between each playing of a record, said path terminating in an angular position of said tone arm having the stylus tip thereof inside the periphery of a record of the smallest size to be played, a trackfinder mechanism operative to support the stylus tip in spaced relationship to the surface of a rotating record and to cause the stylus tip to engage the sound track of a record in the start-of-play position, comprising trackfinder means including latch means to selectively provide for said trackfinder means an operative projecting position in which said trackfinder means is operative to engage the record surface with said stylus tip spaced from the record surface and an inoperative retracted position in which said trackfinder means is effectively disposed above said stylus tip with said stylus tip operative to engage the sound track, first means on said trackfinder means for moving said tone arm across the surface of the rotating record with said trackfinder means in said operative projecting position, second means operative to shift said trackfinder means from the said operative position thereof to the said inoperative position thereof in response to arrival of said tone arm in the said position beyond the edge of the record, actuating means for releasing said trackfinder means from the said inoperative retracted position to the operative projecting position, and means for operating said actuating means at a predetermined point during the said movement of the tone arm between each playing of a record.

26. In a record-changing phonograph having a rotatable support for the records during playing thereof, a record support for a stack of records spaced from said rotatable support, and means operable to supply the lowermost record of said stack from said record support to said rotatable support, in combination a tone arm having stylus means for playing records, trackfinder means operative to support the stylus tip in spaced relationship to the surface of a rotating record and the start-of-play position, said trackfinder means comprising first means, second means, support means for supporting said first and said second means on said trackfinder mechanism including latch means to selectively provide for said first and second means an operative projecting position in which said first means is operative to engage the record surface and to move the tone arm outwardly with said second means and said stylus tip spaced from the record surface and in which said second means engages the record surface after said first means passes beyond the edge of the record to keep said stylus tip spaced from the record surface and an inoperative retracted position in which said first and second means are effectively disposed above said stylus tip with said stylus tip operative to engage the sound track, means operatively connected with said latch means for shifting said first and second means from the said operative position thereof to the said inoperative position thereof, a cycle control means provided with cam means for moving said tone arm through a sequence of cycles including raising said tone arm after playing of a record, moving said tone arm outwardly outside the periphery of the largest record to be played and thereupon moving said tone arm inwardly to deposit the tone arm on the surface of the next record supplied to the rotating support inside the periphery of a record of the smallest size to be played, release means operatively connected with said latch means for releasing said trackfinder means from said inoperative retracted position to the said operative projecting position, and means operative during said cycle movements of said tone arm to actuate said release means.

27. In a trackfinder mechanism for use in a phonograph having a tone arm and a playing member having a stylus tip: a trackfinder structure having a first supporting roller and a second supporting roller, said first supporting roller being more remote from the center of the record than said second supporting roller, said trackfinder structure being movable between an inoperative retracted position in which the lowest points of the periphery of each of said rollers are above the stylus tip and an operative projecting position in which the lowest points of the periphery of each of said supporting rollers is below the stylus tip, the lowest point of said first supporting roller being disposed lower than the lowest point of said second supporting roller, resilient means for normally urging said trackfinder structure into said inoperative retracted position, a recess provided in said second supporting roller, an elongated member extending inot said recess of said second supporting roller with said trackfinder structure in the said inoperative retracted position thereof, means in said second supporting roller operable by gravity to rotate said second supporting roller through an angle upon movement of said trackfinder structure to the operative projecting position thereof so as to bring said recess and said second supporting roller out of alignment with said elongated member whereby the end of said elongated member abuts against the periphery of said second supporting roller remote from said release to thereby retain the structure in the said operative projecting position, said first supporting roller forming an angle with the radius through its contact point with the surface of a rotating record to thereby carry the tone arm across the surface thereof in the outward direction toward the edge of the record, said second supporting roller forming such angle with the radius through its contact point with the rotating record as to move, by its engagement with the rotating record, the tone arm in the inward direction toward the center of the record, the angular rotation of said second supporting roller being such as to enable such time delay of the inwardly directed movement of said tone arm that said first supporting roller substantially engages the edge of said record at the time when said recess in said second supporting roller has reassumed its position of alignment with said elongated member in which position said resilient means moves said trackfinder structure again into the said inoperative retracted position.

28. A trackfinder mechanism for use in a phonograph having a tone arm and a playing member provided with a stylus tip and operative to support said stylus tip in spaced relationship to the surface of a rotating record and to cause the stylus tip to engage the sound track of a record in the start-of-play position, comprising a rotatable roller member operative upon engagement with a rotating record to carry the tone arm across the surface of the rotating record in an outward direction, a friction member movable together with said roller member and being disposed slightly to the rear of said roller member as viewed in said direction of rotation, support means supporting said roller member and said friction member on said trackfinder mechanism including latch means to selectively provide for said roller member and said friction member an operative projecting position in which said roller member is operative to engage the record surface with said friction member and said stylus tip spaced from the record surface and in which said friction member engages the record surface after said roller member passes beyond the edge of the record to keep said stylus tip spaced from the record surface and an inoperative retracted position in which said roller member and said friction member are effectively disposed above said stylus tip with said stylus tip operative to engage the sound track, and means operatively connecting said friction member with said latch means for shifting said roller member and said friction member from the said operative position thereof to the said inoperative position thereof in response to engagement between said friction member and the record surface.

29. A trackfinder mechanism for use in a phonograph having a tone arm and a playing member provided with a stylus tip and operative to support the stylus tip in spaced relationship to the surface of a rotating record and to cause the stylus tip to engage the sound track of a record in the start-of-play position, comprising a first member rotatably supported on the phonograph to enable the tone arm to move outwardly across the surface of a rotating record beyond the record edge with the stylus tip spaced from the record surface, a second member, support means for supporting said first member and said second friction member on said trackfinder mechanism including positioning means to selectively provide for said first and second member an operative projecting position in which said first member is operative to engage the record surface with said second member and said stylus tip spaced from the record surface and in which said second member engages the record surface after said first member passes beyond the edge of the record to keep said stylus tip spaced from the record surface and an inoperative retracted position in which said first and second members are effectively disposed above said stylus tip with said stylus tip operative to engage the sound track, and means operatively connecting said second member with said positioning means for shifting said first and second members from the said operative position thereof to the said inoperative position thereof in response to engagement between said second member and the record surface.

30. A trackfinder mechanism for use in a phonograph having a tone arm and operative to support the stylus tip arranged at said tone arm in spaced relationship to the surface of a rotating record and to cause the stylus tip to engage the sound track of a record in the start-of-play position, comprising first means including a roller member operative to effect travel of said tone arm across the surface of the record in the direction toward the edge thereof, second means including a trailer member operatively connected with said first means to follow the travel path thereof in spaced relationship from the surface of the record while said first means engages the record surface, said trailer member being operative to engage the surface of the record with a predetermined friction under the influence of the weight of the tone arm and being so constructed and arranged as to effectively cause inward movement of said tone arm upon engagement of said trailer member with the record surface, support means for supporting said first and second means on said trackfinder mechanism including latch means to selectively provide for said first and second means an operative projecting position in which said first means is operative to engage the record surface with said second means and said stylus tip spaced from the record surface and in which said second means engages the record surface after said first means passes beyond the edge of the record to keep said stylus tip spaced from the record surface and an inoperative retracted position in which said first and second means are effectively disposed above said stylus tip operative to engage the sound track, and means controlled by the engagement of said second means and the surface of the record to operate said latch means for shifting said first and second means from the said operative projecting position thereof to the said inoperative retracted position thereof including delay means for delaying the unlatching of the trackfinder mechanism.

31. A trackfinder mechanism operative to support the stylus tip of a phonograph in spaced relationship to the surface of a rotating record and to cause the stylus tip to engage the sound track of a record in the start-of-play position, comprising first means, second means, support means for supporting said first and said second means on said trackfinder mechanism including latch means to selectively provide for said first and second means an operative projecting position in which said first means is operative to engage the record surface with said second means and said stylus tip spaced from the record surface and in which said second means engages the record surface after said first means passes beyond the edge of the record to keep said stylus tip spaced from the record surface and an inoperative retracted position in which said first and second means are effectively disposed above said stylus tip with said stylus tip operative to engage the sound track, said first means being operative to move the tone arm outwardly in the direction of the record upon engagement thereof with the rotating record surface and said second means being operative to move the tone arm in the inward direction upon engagement thereof with the surface of the rotating record, means operatively connecting said second means with said latch means for shifting said first and second means from the said operative position thereof to the said inoperative position thereof in response to engagement between said second means and the record surface, and means for delaying a predetermined time the shifting of said first and second means from the said operative position to the said inoperative position in response to engagement between said second means and the record surface.

References Cited in the file of this patent

UNITED STATES PATENTS

| | | |
|---|---|---|
| 1,330,603 | Myers | Feb. 10, 1920 |
| 1,348,357 | Griffen | Aug. 3, 1920 |
| 1,588,389 | Mitchell | June 8, 1926 |
| 1,735,311 | Battey | Nov. 12, 1929 |
| 2,504,596 | Scriven et al. | Apr. 18, 1950 |